United States Patent
Savoy

(10) Patent No.: US 7,143,494 B2
(45) Date of Patent: Dec. 5, 2006

(54) METHOD AND APPARATUS FOR ASSEMBLING EXTERIOR AUTOMOTIVE VEHICLE BODY COMPONENTS ONTO AN AUTOMOTIVE VEHICLE BODY

(75) Inventor: Mark Savoy, Metamora, MI (US)

(73) Assignee: Utica Enterprises, Inc., Shelby Township, MI (US)

( * ) Notice: Subject to any disclaimer, the term of this patent is extended or adjusted under 35 U.S.C. 154(b) by 0 days.

(21) Appl. No.: 10/779,185

(22) Filed: Feb. 16, 2004

(65) Prior Publication Data
US 2004/0158965 A1 Aug. 19, 2004

Related U.S. Application Data

(63) Continuation-in-part of application No. 10/146,780, filed on May 16, 2002, now Pat. No. 6,691,392.

(60) Provisional application No. 60/291,522, filed on May 16, 2001.

(51) Int. Cl.
B23Q 17/00 (2006.01)
B23P 21/00 (2006.01)

(52) U.S. Cl. ............... 29/407.1; 29/407.09; 29/407.01; 29/464; 29/468; 29/705; 29/709; 29/712

(58) Field of Classification Search ............ 29/407.04, 29/407.05, 720, 407.09, 407.01, 407.1, 404, 29/434, 464, 466, 468, 33 K, 281.1, 281.4, 29/281.5, 714, 712, 705, 707, 709
See application file for complete search history.

(56) References Cited

U.S. PATENT DOCUMENTS

| | | | |
|---|---|---|---|
| 3,052,974 A * | 9/1962 | Williams ................. | 29/407.04 |
| 4,086,522 A * | 4/1978 | Engelberger et al. .. | 318/568.13 |
| 4,589,199 A * | 5/1986 | Ohtaki et al. ................. | 29/714 |
| 4,619,031 A * | 10/1986 | Loewe et al. ................. | 29/434 |
| 4,645,348 A | 2/1987 | Dewar et al. | |
| 4,813,125 A * | 3/1989 | Dacey, Jr. ..................... | 29/714 |
| 4,841,460 A | 6/1989 | Dewar et al. | |
| 4,976,026 A | 12/1990 | Dacey, Jr. | |
| 5,005,277 A * | 4/1991 | Uemura et al. .......... | 29/407.04 |
| 5,010,634 A * | 4/1991 | Uemura et al. .......... | 29/407.05 |
| 5,072,506 A * | 12/1991 | Dacey, Jr. ..................... | 29/464 |
| 5,090,105 A | 2/1992 | DeRees | |
| 5,148,591 A * | 9/1992 | Pryor ...................... | 29/407.04 |
| 5,150,506 A | 9/1992 | Kotake et al. | |
| 5,168,453 A * | 12/1992 | Nomaru et al. ............. | 700/114 |
| 5,455,765 A * | 10/1995 | Pryor .......................... | 700/62 |
| 5,491,058 A | 2/1996 | Jones et al. | |
| 5,829,123 A * | 11/1998 | Shashlo et al. ................ | 29/703 |
| 5,845,387 A | 12/1998 | Bonnett et al. | |
| 5,987,726 A | 11/1999 | Akeel | |
| 6,006,635 A * | 12/1999 | Stojkovic et al. ............. | 81/484 |
| 6,073,330 A * | 6/2000 | Roy .......................... | 29/281.5 |
| 6,098,265 A * | 8/2000 | Stojkovic et al. ............. | 29/464 |

(Continued)

Primary Examiner—Essama Omgba
(74) Attorney, Agent, or Firm—VanOphem & VanOphem, P.C.

(57) ABSTRACT

The present invention generally relates to a method and programmable apparatus for the assembly of body components to an automotive body that has undergone a progressive series of framing and welding steps so as to produce a structurally rigid body frame, termed a body-in-white. More specifically, this invention relates to creating a new net locating scheme (X-Y and Z Cartesian coordinate system) for a body-in-white to direct associated tooling to create net attachment features on a rigid body frame with respect to a new net locating scheme so that components may be attached to an automotive body at a net location eliminating the need for any slip plane attachment techniques.

44 Claims, 16 Drawing Sheets

U.S. PATENT DOCUMENTS

| | | | |
|---|---|---|---|
| 6,122,819 A * | 9/2000 | Roy et al. ................... 29/714 |
| 6,163,946 A * | 12/2000 | Pryor ..................... 29/407.04 |
| 6,167,607 B1 * | 1/2001 | Pryor ..................... 29/407.04 |
| 6,301,763 B1 * | 10/2001 | Pryor ..................... 29/407.04 |
| 6,317,953 B1 * | 11/2001 | Pryor ..................... 29/407.04 |
| 6,360,421 B1 | 3/2002 | Oatridge et al. |
| 6,378,186 B1 * | 4/2002 | Angel ..................... 29/281.1 |
| 6,378,190 B1 * | 4/2002 | Akeel ..................... 29/407.08 |
| 6,425,177 B1 * | 7/2002 | Akeel ..................... 29/714 |
| 6,629,354 B1 * | 10/2003 | Kline ..................... 29/559 |
| 6,643,905 B1 * | 11/2003 | Rhoads et al. ........... 29/407.09 |
| 6,675,467 B1 * | 1/2004 | Oatridge et al. .............. 29/771 |
| 6,691,392 B1 * | 2/2004 | Savoy et al. ............. 29/407.09 |
| 6,711,800 B1 * | 3/2004 | Savoy ..................... 29/434 |

\* cited by examiner

METHOD AND APPARATUS FOR ASSEMBLING EXTERIOR AUTOMOTIVE VEHICLE BODY COMPONENTS ONTO AN AUTOMOTIVE VEHICLE BODY

CROSS-REFERENCES TO RELATED APPLICATIONS

This application is a continuation-in-part application which claims the benefit of nonprovisional U.S. patent Ser. No. 10/146,780 filed May 16, 2002, now U.S. Pat. No. 6,691,392 B2 issued Feb. 17, 2004, which claims the benefit of U.S. provisional patent application Ser. No. 60/291,522 filed May 16, 2001.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to a method and apparatus for the assembly of body components to an automotive body that has undergone a progressive series of positioning and welding steps so as to produce a structurally rigid body frame, termed a body-in-white. More specifically, this invention relates to reestablishing a new grid system (XYZ coordinate system) for a body-in-white, after assembly, so as to direct the associated tooling to establish net attachment positions for all body components thereby eliminating the $B'_L$, $B'_R$, $C'_L$, $C'_R$ need for any slip plane adjustment techniques.

2. Description of the Related Art

For many decades, automobile and truck body frames, that typically include at least an underbody, a pair of side frames, and front and rear headers, conventionally undergo a progressive series of positioning and welding steps before a structurally rigid body frame, termed a body-in-white, is produced. Though bodies are still manually assembled and welded, emphasis on automated assembly and welding operations has for many years generated numerous automated and semi-automated framing systems.

In an attempt to create and maintain dimensional integrity in the building of automotive bodies, typically, framing systems that involve a degree of automation include the operations of locating the components relative to each other on the underbody. Primary locating points established on the underbody are used throughout the body shop operation as well as in the body inspection room and are generally established by locating on each of the rails, a four way locating pin forward and a two way locating pin rearward. Usually, the underbody is then clamped in place at specific points of location. The primary locating points are also used to locate for purposes of inspection in the body build shop. The components are located relative to each other and relative to the underbody and are loosely assembled to each other. Typically, the various components include a floor panel, right and left body side panels, a dash panel and either a roof panel or transversely extending header members upon which a roof panel is subsequently mounted. After these individual panels are stamped, in some applications, preliminary assembly operations are performed on individual panels as, for example, adding door hinge and latch hardware to the body side panels at approximate locations on a door opening, adding seat mounting brackets and reinforcements to the floor panel, etc.

The set of panels that constitute a subassembly of the finished vehicle body are then brought together and loosely assembled to each other. This initial loose assembly technique is frequently accomplished by a so called "toy tab" arrangement in which one panel is created with a tab projecting from one edge that is received in a slot in an adjacent panel. This technique interlocks the panels and frame members to each other to the point where they will not separate from each other, but does not achieve a rigid assembly, that is, for example, the side panels may tilt slightly relative to the floor panel. Alternatively, some initial pre-tack welding may be performed in order to loosely maintain the components together. The loosely assembled subassembly is then transported to a framing/welding station whereat, in order to accurately establish the desired final geometry of all of the components of the body-in-white, the toy tab components are clamped to locating frames, often termed gate fixtures. Thereafter, welding operations, are performed within a framing and subsequent respot station to more permanently and securely weld the components together and to accurately form a rigid structure referred to as the body-in-white. Current body framing stations employ both fixed and robotic welders that can be programmed to perform several welds at different locations on the body in one framing station. The welders typically are located at opposite sides of the conveying line at the welding station, and when the body's subassembly is located in the welding station, the fixed weldings and robotic welders perform welds on designated areas on the body. In those cases where clamping frames are positioned on opposite sides of the body, clearance problems may restrict motion of the welding heads that must pass through the clamping frame before they have access to specific areas of the body to be welded. This will result in the performance of only a portion of the required welding at one station and the advancement of the partially welded subassembly to a subsequent respot welding station where different clamping frames allow the welding head to access those portions of the body assembly that could not be reached by the welding heads in the first station. After the body is transported to the final welding, or respot station, the remaining welds are made to establish a structurally rigid body frame.

Although many variations of the above process are known, it is the general object of each framing system to accurately net locate the body components relative to each other and maintain the established net location or position throughout the later welding operations, until the structural rigidity of the body-in-white is sufficient to preserve the desired geometric configuration throughout the assembly process.

It is readily recognized that these conventional assembly techniques include many assembly steps that require parts to be physically stacked on top of one another and then secured to each other by welding, and wherein each component is created with a certain accuracy and tolerance limits. That is, a particular component, and any point on that component, is typically required to be manufactured to a specific dimensional configuration, within a specified tolerance range. If an individual panel to be affixed references a point on another panel, the reference point also has a dimensional tolerance variation. The tolerance of the assembly formed by these components will also be "stacked" together. That is, the dimensional tolerance of the first panel will be added, to some degree, to that of the second panel to be attached thereto. As more components are fixed to the assembly that references additional attachment points, the tolerances of the individual points are "stacked" to create a greater tolerance variation for the "stacked" components.

The small tolerance variations in the primary locating points for locating the underbody combined with the gate fixtures that typically allow some play in the positioning of the panels prior to clamping inherently results in some built-up inaccuracies for the body-in-white. Also, the repositioning of the framing system in a respot station, again, results in an additional positional tolerance variation inherently creating additional inaccuracies for the location of the various panels with respect to each other. Accordingly, it is quite evident that as a number of panels with positional dimensional tolerances are stacked the total manufacturing tolerance of the framed body-in-white will increase. Experience has shown that the "stacking" built-in tolerances in the framing process increases the total manufacturing tolerance and can become quite substantial.

Accordingly, over a period of years, many have attempted to improve the manufacturing method so as to reduce the overall or total tolerance in vehicle assemblies utilizing a variety of techniques in an attempt to reduce the inherent inaccuracies of the vehicle body assembly as well as the body-in-white.

To attempt to reduce the inherent built-in inaccuracies in the process of building automobile bodies with the objective of reducing overall tolerance variations, many alternative framing schemes have been proposed over the years. For example, DeRees, U.S. Pat. No. 5,090,105, teaches a modular vehicle construction assembly method in which various structural modules are fabricated and assembled with operating vehicle components prior to mounting with other fabricated and assembled modules. For example, a first module having a chassis frame and a passenger platform that is used in the formation of the underbody of the vehicle is proposed. A second module in the form of a cowl or dashboard includes a structural frame, preferably formed from stamped panel components, that include a windshield frame portion integrally formed with a dash panel frame portion. A third modular component includes a flooring platform, two first side-wall structures and at least one closure device extending across the first sidewall structures above or at one end of the flooring system. The fourth module includes two second sidewall structures, reinforcement for supporting the second sidewall structures in a fixed position with respect to each other, a hood panel and device for displaceably mounting at least a portion of the fourth module to the first module. Each of the first through fourth modules is completely assembled, including the installation of vehicle operating components, prior to its attachment to the other modules. The resulting structure incorporates each of the modules by locating each module at a net position thereby reducing the overall built up tolerance for the complete assembly. However, within each module, DeRees is still proposing that the device for securing the panels together utilizes conventional welding techniques or welding substitutes such as mechanical interlocking of the panels, mechanical fastening, bonding with adhesives, bolting, riveting or the like.

Angel, U.S. Pat. No. 6,378,186, teaches a framing device for assembling and welding a body-in-white utilizing completely separate framing and welding operations that are typically intermixed in conventional framing systems. The framing device is a unitary frame structure within which an underbody, side frames, and other body components can each be supported and accurately positioned with respect to each other prior to the welding operation. Using an appropriate number of clamping devices, the net position of the body components that constitute the body-in-white are properly established and maintained, such that gate fixtures are unnecessary during the welding operation. The structure of the framing device provides considerable access to the body-in-white supported within the interior of the framing device such that a greater number of welding guns can be used during the welding process to complete all of the welding necessary to maintain the rigidity and geometry of the body-in-white in a single welding operation or station.

Bonnett et al., U.S. Pat. No. 5,845,387, teach a method of constructing a vehicle body with reference to a single assembly station by moving multiple panels into an assembled position nonclampingly fixed with an adhesive and in spaced relationship without direct contact therebetween. The vehicle body is constructed by presenting a plurality of discrete body panels into assembled positions with respect to a single base for application of an adhesive thereon to fix the body panels in a nonclamping, spaced relationship without direct contact therebetween. The body panels include an underbody, a first side panel on a first side of the underbody and a second side panel on a second side of the underbody, a front end member mated with the underbody, the first side panel and the second side panel, and a roof panel substantially co-planar with the underbody in mating relationship with upper mating flanges on the first and second side panels. Such structure avoids tolerance stack-up between the assembled panels by controlling the adhesive bond gap variance between the panels. The adhesive is a heavy-duty urethane structural adhesive. The resulting vehicle body assembly reduces tolerance stack-up and has the additional advantage of having relatively little inherent stress points developed between mating panels since they are assembled at a single stage framing fixture, or assembly apparatus.

Oatridge et al., U.S. Pat. No. 6,360,421, like DeRees, teach a manufacturing or assembly technique wherein the assembly includes a plurality of individual components that are independently formed into a substantially rigid initial subassembly structure thereafter, for each remaining component referencing from the substantially rigid structure a desired position for each remaining component and fixing such remaining component to the subassembly at the desired position whereby the overall tolerance of the manufactured assembly is reduced.

Although a majority of the prior art has recognized the existence of built in inaccuracies in the building of automotive bodies, by the stacking of tolerances between adjacent components, resulting in unacceptable mating conditions, little has been said in the prior art regarding those inherent inaccuracies of the various processes themselves. For example, many of the processing techniques require the rigid clamping of the various components, panels or subassemblies on the fixtures for the purpose of obtaining maximum support rigidity before the components are welded together. However, if any misalignment exists between associated components or panels, the spot welding that creates the weld will tend to displace the component or panel from the desired assembly location to some unknown position relative to design-intent or an established X, Y and Z Cartesian coordinate systems. Accordingly, although modular construction may be suggested to avoid tolerance build up, the clamping of the modular components into the rigid fixtures can easily result in stretching or compression points in the vehicle body that may cause stress induced cracks or other deficiencies especially after the weld is created. Thus, the problem with existing fixtures whether they are framing fixtures or tooling to assemble modular components is that these assemblies are assembled with internal stresses that can cause deformities in the assembled sheet metal resulting in failures to the assemblies when in use i.e. popped welds etc. Further, after clamping these components or panels into the rigid fixtures, thousands of welds are produced resulting in additional stresses as well as distortion due to the heat and pressure associated with the use of welding guns leading to the conclusion that after the body-in-white has been processed in the appropriate framing and welding stations, it is impossible to know the final location of the surfaces as well as any targets, master holes or whatever else is attached to the panels before the welding operations occur. Although the objective in the framing and welding station is to locate panels at so called "net" or design-intent locations, the variety of unknowns due to processing through the stations causes every vehicle body and its associated surfaces to be built differently. In the past this has been considered to be an acceptable body to process providing that master attachment points or panels are within an acceptable tolerance range from net or design-intent location. For decades, it has been common practice in the automobile industry to incorporate a "slip plane" in the assembly of outer body panels to the body-in-white. The slip plane enables the appropriate outer panels to be attached and manually fit at assembly relative to adjacent panels. Until recently, a slip plane was necessary in order to meet quality and fit requirements of the marketplace and competition, and to provide an appearance that is more pleasing and more aerodynamic due to flushness and/or alignment of features on an outer panel with adjacent outer surfaces of a vehicle.

Slip planes are designed in component assemblies where as a result of manufacturing variations of the components, as for example a door and a hinge on a vehicle, it is necessary to provide a device to enable a door to be manually fit to the body opening at final assembly. The slip plane permits fore/aft and up/down adjustment of the hinge as necessary to permit the door to be fitted within the body opening with an equidistance gap around the door and between body openings. Slip planes can be planned to be within any coordinate or plane of an X, Y and Z coordinate system as for example on a vehicle the fore/aft direction, cross-car direction and up/down direction that are respectively designated as X, Y and Z. The appropriate plane to incorporate a slip plane is based on the specific surface feature required to be aligned with respect to an adjacent surface feature on an adjacent outer panel of the vehicle body. The slip plane is an adjustment feature that compensates for the inevitable tolerance variations that differs between vehicles. Slip planes are generally used at the interface between attachment points as for example a door hinge and the major trim panels to which the hinge is to be attached to the vehicle body. Because of the tolerance variations of the body-in-white, excessive gapping may result between panels or between the door and a door opening. Further, in the case of moving trim panels such as doors, and decklids, pinch points may occur as a result of variation in location of the attachment point with respect to the opening in which the major panel is mounted. Accordingly, a slip plane, as for example in the door hinge and/or door panel, has always been used to provide for manual final fitting of the door with respect to the door opening to balance out the gap between the doors and major trim panels, such as fenders, as well as to ensure proper flushness of adjacent major outer panels.

The problem of inherent stresses and distortions as a result of the assembly process has been recognized in the prior art and several attempts to provide more accuracy in the assembly process of a vehicle have been made in order to solve the problem.

Earlier, it was believed that by establishing the attachment points at net or design-intent position on the body-in-white frame structure at least some of the inaccuracies between the panel to be attached and the body-in-white would be eliminated. However, due to the distortions of the body-in-white as a result of the assembly/welding processes, it was still necessary to provide a slip plane in order to permanently attach the outer body attachment panels for the purpose of obtaining proper gaps and correct flushness between adjacent panels as well as alignment of feature lines between adjacent panels. The apparatus and process by which a device established a datum position from an object having dimensional variations within a known tolerance range is disclosed in U.S. Pat. No. 4,976,026 to Dacey, Jr. and is owned by the current assignee hereof. Dacey, Jr. teaches an apparatus and method for establishing a location in space (a datum position) utilizing an object having dimensional variations in each of the X, Y and Z planes within a known tolerance range. Upon establishing a location in space, the device is immobilized at the datum position and work is performed on the body-in-white with respect to the datum position. The apparatus includes a fixed base structure for rigid mounting to a floor adjacent to an assembly line, a transfer platform movably attached to the base structure so that the transfer platform can move in a horizontal direction with respect to the fixed base structure, a support structure assembly attached to the transfer platform that is adapted to move in a horizontal direction perpendicular to the direction of movement of the transfer platform, a vertical slide assembly movably attached to the support structure assembly and movable therewith in a vertical direction, fluid actuated positioning and locating members attached to the apparatus for immobilizing the horizontal and vertical movements of the apparatus, as well as a plurality of probes attached to the apparatus for locating pre-established selected reference surfaces or gage points from which the datum position can be established. The invention further includes a work performing tool attached to the position finding apparatus so that it can perform work on the object with respect to the established datum position. Since the apparatus of Dacey, Jr. relied on utilizing reference positions on the body-in-white, that resulted from imprecise and unknown locations due to the inherent stresses and distortions created during the assembly process, the positions were continuously different although within an acceptable tolerance range on each body-in-white. The datum position established based on these unknown distortions of the body-in-white created by the assembly and welding processes provided so called "design-intent" positions that varied significantly as a function of the inaccuracies of the vehicle frame created during assembly.

Akeel, U.S. Pat. No. 5,987,726, teaches a solution to avoid the creation of internal stresses that could cause failure of the assemblies when in use. Akeel, teaches an apparatus for positioning an object during an assembly operation including a parallel link programmable positioning mechanism having a base plate, a spaced apart locator plate and six linear actuator links extending between the two plates and attached thereto by universal joints. The base plate is connected to the locator plate with the plurality of linear actuators, each having a lower end pivotably attached to the base plate and an upper end pivotably attached to the locator plate. When an object is mounted on the locator plate, the linear actuators are controlled to move the locator plate to a predetermined position relative to the base plate for contacting the object mounted on the locator plate with a component to be assembled. A feedback signal is generated representing a force supplied to the locator plate when the object contacts the component and thereafter the linear actuators are actuated to change the applied force in response to the feedback signal. This locating method provides for a stress free assembly of sheet metal components on assembly fixtures.

Kotake et al., U.S. Pat. No. 5,150,506, also teach a method of assembling exterior parts of an automobile wherein assembly accuracy errors of the vehicle body or body-in-white are determined by measuring the actual positions of a plurality of reference points of the body-in-white after it has been processed through the framing/welding station. Correction data is then generated by comparing the actual measured position of a point to the wire frame data or design-intent position of the same point while maintaining a correlated relationship amongst the parts, to eliminate correlated misalignment among those parts due to assembly accuracy errors of the body. The measurement of the assembled position of the vehicle body may be made at the assembly station of the parts or at any arbitrary station that is located on an upstream side of the assembly station. In the latter case, the measured as assembled, data is read by a processor that generates correction data for the parts assembled positions that is transmitted from the measuring station to the assembling station. When the vehicle body is conveyed into the assembling station, the conveyed position is detected by encoders and the parts are assembled after corrections are made in accordance with the correction data. The reference points of the vehicle body are detected by the encoder device provided at the assembling station and, on the basis of the positional information, correction data for each assembling position of an exterior part is calculated by comparing the actual position detected by the encoders with the wire frame data in a computer so that the correction data is transmitted to a robot controller of a corresponding assembly robot to correct the assembling position of each part.

Accordingly, as desired, the location of any individual point on a panel after the body has been welded together is determined by the use of encoders and the deviation from the mean position of the point is calculated by comparing the actual reading to the net location of where that point should be so that a deviation from mean of the location of the point is determined. This deviation, in the form of a correction data, is communicated to the assembling robot in order to instruct the robot of the actual position of the point on the body-in-white panel with respect to the design-intent position so that each component to be assembled at that point may be separately adjusted to a corrected position in order to provide a corrected attachment point for assembling each of the outer body panels to the appropriate holes formed in the underbody and thereby maintain flushness of adjacent panels. Accordingly, each attachment point is selectively investigated as to deviation from mean and a correction is made when comparing the actual location of the attachment point to the mean location to ensure that the holes in the outer panels line up properly with the holes in the underbody to enable a successful attachment of the outer panel and ensure flushness to adjacent panels. Obviously, when using this sophisticated equipment in a production environment many problems can surface including but not limited to, environmental debris as a result of welding operations, sensitivity problems with the equipment, technical support team necessary to monitor equipment, etc. Also an additional station is needed in the production line to enable measurement by the encoders of the actual points on the body-in-white.

Therefore, what is needed is an apparatus and technique for assembling automotive frame components that recognizes and accepts the existence of these internal stresses and distortions of the various panels constituting the body-in-white that have been welded with, in some cases, as many as three thousand welds, yet is able to establish a reliable assembly technique utilizing a feature of Dacey, Jr., that is, insuring the fabrication of attachment points that are in a net or best fit position on the complete body-in-white that is also then assured to be in a known position so that the outer panels may be directly attached to the body-in-white with attachment points assured to be in the same position so that the outer panels may be directly attached to the body-in-white without the need for slip planes and without the need for being concerned of the inherent variations established by the body building process itself.

BRIEF SUMMARY OF THE INVENTION

According to the present invention, there is provided a method and apparatus for optically establishing a new master locating scheme for an automotive vehicle body, otherwise known as a body-in-white, and thereafter using robotically driven tools to precisely assemble components to the body-in-white relative to its new master locating scheme. After the body-in-white has been processed through the framing/welding station(s), work performing tools are robotically positioned with respect to the new master locating scheme and work is performed on the body-in-white to create net or best-fit attachment features adapted to accommodate the attachment of other components and thereby produce a finished vehicle body that meets the flushness and gap specifications between adjacent panels established by the vehicle design team.

The apparatus of the present invention is intended to be part of the production assembly line after the various panels have been framed and welded together as a unit to establish a completed body-in-white. The body-in-white is transported by a carrier device along the assembly line, and is provided with a predetermined arrangement of datums typically including reference holes, slots and/or surfaces. The apparatus includes two and three-dimensional optical sensors, such as those commercially available from Perceptron, Inc., positioned on each side of the assembly line relative to a predetermined datum feature of the body-in-white. Each optical sensor is adapted for locating up/down, fore/aft and cross-car datum features of the body-in-white, and for communicating such location to a microprocessor. As the optical sensors locate features that have surfaces which have been processed through the framing/welding station. The effect of distortion of these features on surfaces and other inherent process variables of the body-in-white, as a result of the assembly and welding processes, will be realized by these sensors.

The microprocessor establishes specific points in terms of the Cartesian X, Y and Z coordinate system that represent the primary locating points of the body-in-white as built, that is, including the inherent tolerance variations and distortions caused by the framing and welding operations. The microprocessor then compares the primary locating points of the body-in-white as built with the design-intent primary locating points and divides the total variable in half to generate new X, Y and Z centerlines that takes into account the variations and distortion of the body-in-white in the as built condition as will be discussed in more detail hereinafter. The present invention is adapted to create separate X, Y and Z centerlines or gridlines for the body-in-white attachment locations as required for a particular application. For example, the optical sensors may be configured to locate a first group of reference datums near the front of the body-in-white to create a first specific set of X, Y and Z coordinate centerlines for the attachment of the hood, and a second group of reference datums near the rear of the body-in-white to create a second specific set of X, Y and Z coordinate centerlines for the attachment of the trunk.

The new X, Y and Z coordinate centerlines of the body-in-white as built are then communicated to the robotically positioned work performing tools that perform work relative thereto. As a result of being able to balance out any created or inherent errors of the body-in-white due to processing through the framing station, all attachment holes, slots, pads etc. created by the work performing tools can be located with respect to the newly established X, Y and Z coordinate system and therefore all locations of the attachment features are net to the newly created X, Y and Z coordinate system. Furthermore, the new mastering scheme creates the absolute best-fit attachment feature and completely eliminates the need to provide for a slip plane in order to attach a component to the body-in-white. Therefore, any outer body component, i.e. hood, fender, doors, decklid, liftgate, front bumper, rear or front fascia etc. being attached to the body-in-white can be fabricated with attachment feature at net or design-intent positions since they will be attached to a net attachment point on the body-in-white.

The invention also encompasses a method for establishing a new Cartesian X, Y and Z coordinate system taking into account the inherent error created by assembling the various panels of a vehicle body in a framing and/or welding station.

The method of establishing a new coordinate system taking into account the variations of the as built vehicle body upon which work is to be performed is set forth. The method also encompasses the performance of work on the vehicle body at a location remote from a plurality of independently established primary locating points.

The principle object of the present invention is to provide a new and improved apparatus and method for establishing a new Cartesian X, Y and Z coordinate system for a vehicle body otherwise known as a body-in-white. The invention encompasses performing work at this new X, Y and Z coordinate or grid system so as to provide net reference attachment features for the various components that will subsequently be attached to the body-in-white.

Another object of the present invention is to provide a new and improved apparatus and method of balancing out the inherent error generated by the processing of the body-in-white through the framing and welding operations.

A further object of the present invention is to perform work on a body-in-white relative to a newly established X, Y and Z coordinate system so as to provide new net attachment features for the various outer body panels and/or attachments to be made to the body-in-white.

Still another object of the present invention is to provide an apparatus that can interact with a body-in-white and generate a new reference position with respect to known design-intent reference positions, balance out any errors at this given reference position and establish a new reference coordinate system for the body-in-white so that, thereafter, work can be performed on the vehicle body at a location remote from the established reference position.

Another object of the present invention is to provide an apparatus that relies primarily on a programmable robotic device and associated microprocessor system for accomplishing part of its motion relative to an adjacent workpiece.

Also, another object of the present invention is to provide an apparatus that has freedom of movement in at least three dimensions to locate and lock on primary locating points of unknown dimensions and thereafter re-establish a new net X, Y and Z coordinate system for the primary locating points that are used, in turn, by the associated tooling to perform work relative to the new net X, Y and Z coordinates on the vehicle body to create attachment features for outer panel components thereafter intended to be attached to the body-in-white.

Another object of the present invention is to provide a method for the manufacturer of attachment features on a vehicle body-in-white structure that are created with reference to a newly established X, Y and Z coordinate system based on balancing out the inherent errors existing in the body-in-white from the framing and welding operations.

Yet another object of the present invention is to provide a programmable apparatus that has attached thereto a work performing tool net located to a newly established X, Y and Z coordinate system for the object whereafter the tool is located and held by the programmable apparatus for a time interval sufficient to permit the tool to accomplish its task and be withdrawn from the proximity of the object being worked on.

Yet another object of the present invention is to establish attachment references on a body-in-white without the use of slip planes.

Still a further object of the present invention is to provide a programmable apparatus for reforming an element of an automotive inner body panel to present a portion of the surface of such element at a predetermined net position with respect to a newly generated X, Y and Z coordinate system for the attachment of an outer body panel thereto.

It is a further object of the present invention to provide a programmable apparatus and method for establishing a new X, Y and Z coordinate system of an automotive inner body panel to present a portion of the surface of such element at a predetermined position for the attachment of another element thereto by a robot and for forming a net hole in such surface to facilitate the attachment of the element thereto.

For a further understanding of the present invention and the objects thereof, attention is directed to the drawings and the following brief descriptions thereof, to the description of the preferred embodiment of the invention and to the claims.

DETAILED DESCRIPTION OF THE PREFERRED EMBODIMENT

Generally shown in the Figures, is a method and apparatus for utilizing position detection apparatuses to locate primary locating points on a vehicle body, also known as a body-in-white. In accordance with the present invention, after the primary locating points have been located and the position detecting apparatus have been locked in place, a set of locator pins and input sockets, one of which is attached to the position detecting apparatus and the other of which is attached to a balancing lever mechanism fixed to the gantry spanning the production line, is used to balance out or average the deviation of the primary locating points in cross-car, fore/aft and up/down directions of the actual body-in-white as built, from design-intent positions. This average or balancing out would obviously not be required if the processing of the body-in-white resulted in all panels and attachment points being actually located at design-intent position after the vehicle body was processed through the framing and welding station. Unfortunately, a perfect body-in-white exists only in sophisticated CAD systems on a computer. In the real world, bodies-in-white are made with a variety of assembled parts, each having tolerance variations resulting in tolerance stack-ups. Further, the effect of as many as three thousand (3000) welds make it impossible to predict the final assembled location of any point on the body-in-white with any great specificity. Accordingly, tolerance variations of any point on the body-in-white after processing are expected, and acceptable within a given tolerance range. The invention contemplates balancing out these unknown variations and therefrom create a new known X, Y and Z coordinate system or grid for the body-in-white in the "as built" condition. A second set of output sockets and locator pins, one of which is mounted to the balancing mechanism, the other being mounted to a second position detecting apparatus associated with the tooling surrounding the body-in-white, interact or plug into each other to float the tooling station into a net position with respect to the newly created coordinate system, created by the balancing technique, so that work may be performed on the body-in-white relative to a new net X, Y, and Z coordinate system of the body-in-white.

In the context of the following detailed description of the preferred embodiment, which is a vehicle body for an automobile, reference to the fore/aft (X), cross/car (Y), and up/down (Z) axis, as well as the relative terms front, rear, top and bottom, apply to a vehicle body as viewed in the final assembled position unless otherwise specified. Also, reference to a "Class A" surface means any surface on the completely assembled automotive vehicle body that is visible to an observer.

Figure 1:
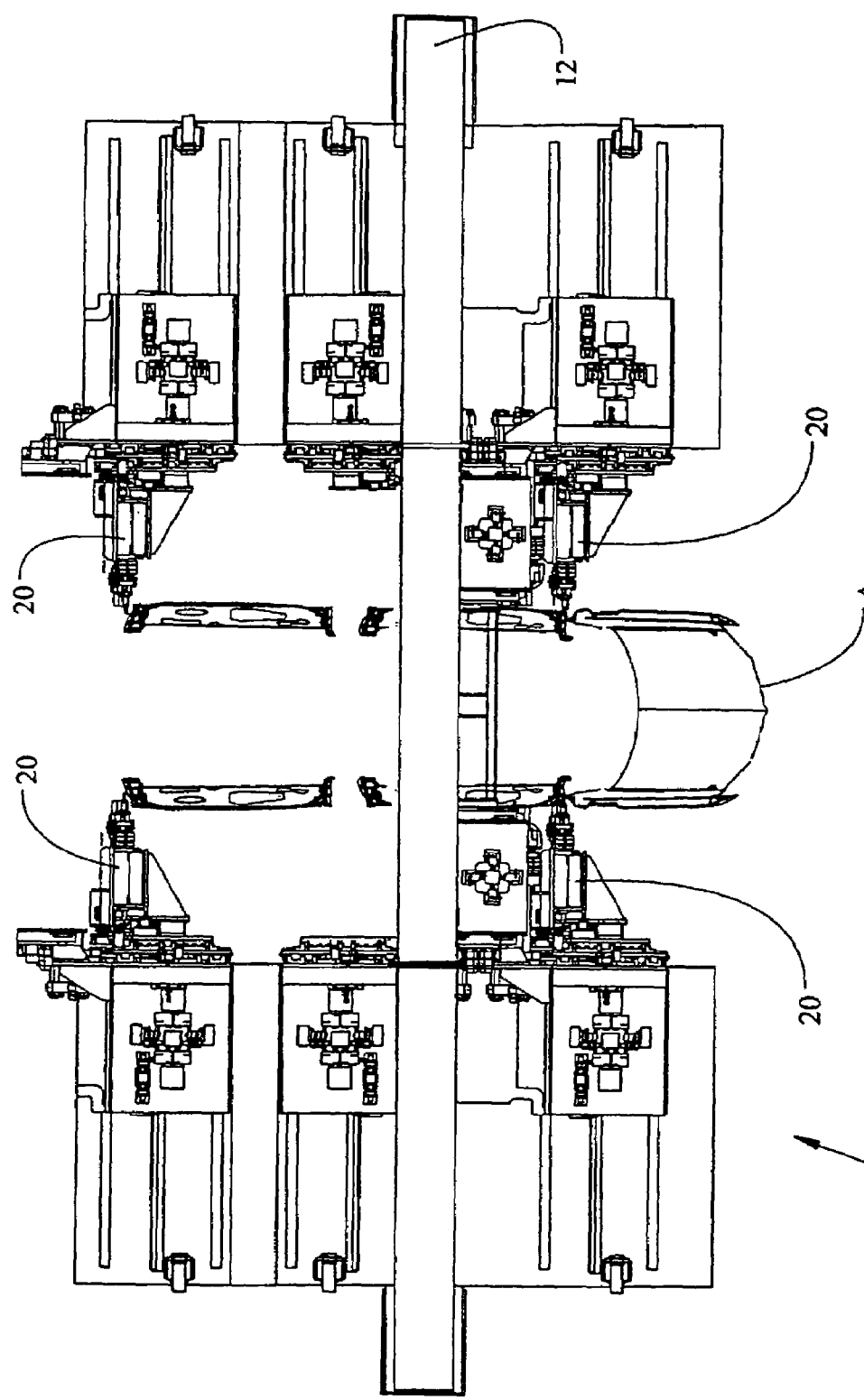
FIG. 1 is a top view of a partial body-in-white located in the preferred embodiment master locating station with a gantry and wherein the tooling has been removed in order to clearly view the position detecting apparatuses, the front two of which are engaged with the vehicle body.

With reference now in detail to the Figures, FIG. 1 shows a portion of a vehicle body or body-in-white A in a master locating station 10 having a front gantry 12 and rear gantry (not shown) with appropriate position detecting apparatuses 20 located selectively at four feature points or primary locating points (not shown) on the body-in-white A so as to find the actual location of unknown primary locating points on the body-in-white A and thereafter immobilize the position detecting apparatuses 20 with respect to the primary locating points of the body-in-white A. It is understood that the primary locating points selected can change based on the requirements of the specific vehicle as well as what subjectively may be determined by the body building team to be important features that need to be properly fit for gapping or flushness, or relative importance, as a feature line across the complete body side of the vehicle body.

The position detecting apparatus 20 selected is described in detail in Dacey Jr., U.S. Pat. No. 4,813,125 owned by the assignee hereof and that is incorporated herein by reference in its entirety. For the purpose of clearly understanding the current invention, some limited description of the position detecting apparatus 20 is provided. The apparatus as described in U.S. Pat. No. 4,813,125 includes a fixed base structure for rigid mounting to a floor adjacent to an assembly line, a transfer platform is movably attached to the base structure so that the transfer platform can move in a horizontal direction with respect to the fixed base structure. A support structure assembly in the form of an angle plate is mounted to the transfer platform that in turn is adapted to move in a horizontal direction perpendicular to the direction of movement of the transfer platform. A vertical slide assembly is movably mounted to the angle plate of the support structure and movable with respect thereto in a vertical direction. Fluid actuated positioning and locating members are attached to the apparatus to permit limited movement with respect to all three directions, that is X, Y and Z directions and further includes a device for immobilizing the horizontal and vertical movements of the apparatus. A plurality of probes and/or contact blocks are attached to the position detecting apparatus 20 for locating selected pre-established reference surfaces or primary locating points on the vehicle body so that the position detecting apparatus 20 can move into position at the primary locating points in order to "find" the location of these points in an X, Y and Z coordinate system within a known tolerance range. Although the position detecting apparatus 20 selected is a mechanical device, it is within the scope of the invention that vision systems, electro-optical or other suitable sensors, or lasers in combination with robotic tools may be used to detect the position of selected primary locating points on a body-in-white A.

Figure 2:
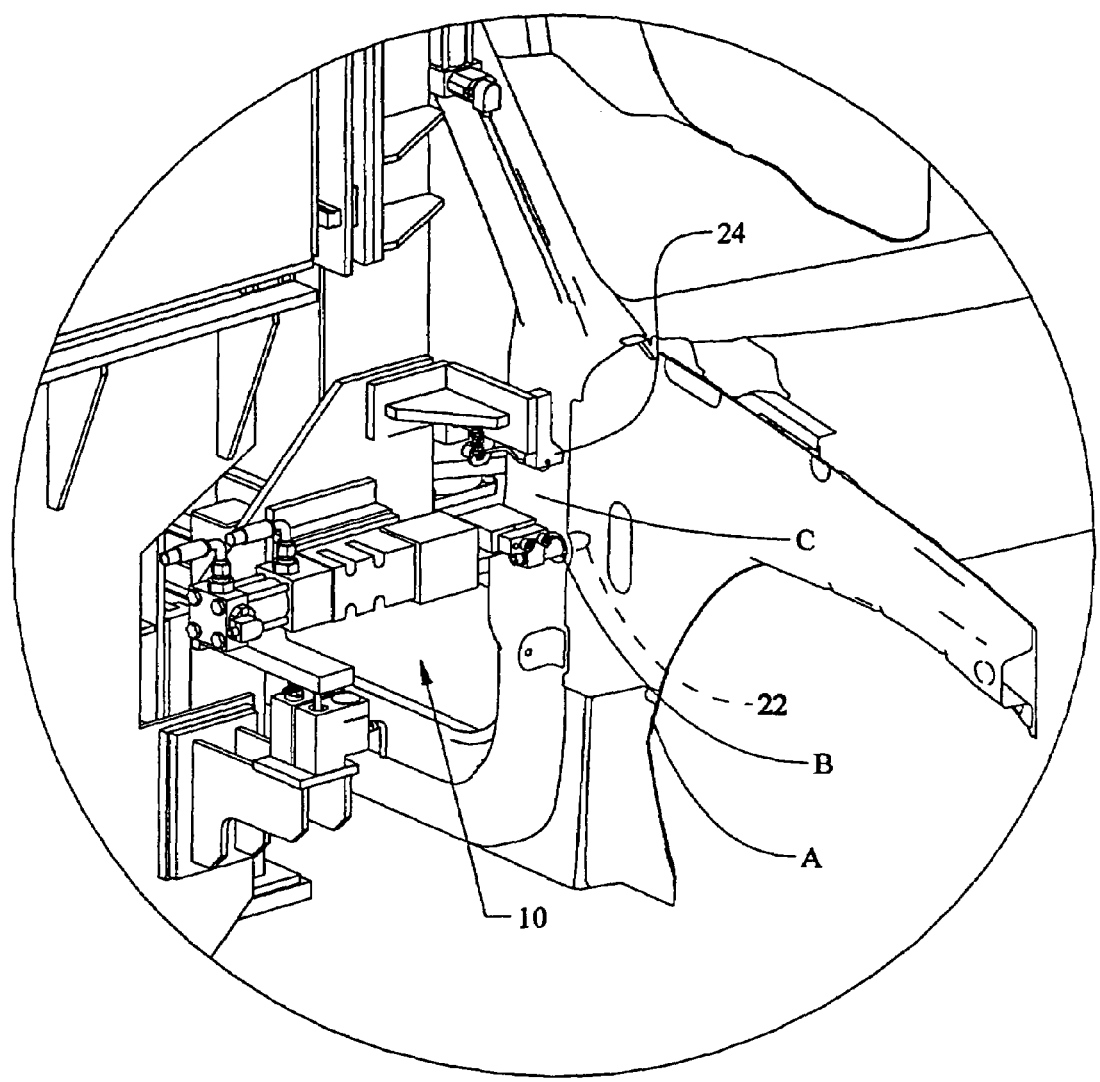
FIG. 2 is a partial isometric view of the position detecting apparatus located in the front right hand primary locating points of the vehicle shown in circle 2 of FIG. 3.

As shown in FIG. 1, the position detecting apparatuses 20 are located on each side of an assembly line spaced with respect to the body-in-white A that will be processed therethrough. For purposes of clarity the rear gantry spanning across the production line and all of the associated tooling are not shown and further, the complete body-in-white A is not shown so as to enable viewing the position detecting apparatuses 20 in the front and the rear of the master locating station 10. FIG. 2 is a close up of the right front quarter of the vehicle body A being processes wherein the position detecting apparatus 20 has been isolated and illustrates a probe 22 located in a gage hole in the front pillar, defining a the actual location of point B, to establish X and Z positions as well as a contact block 24 touching the vehicle in order to establish a cross-car or Y position of a Class A surface C on the front pillar.

The contact block 24 is adapted to carry a low DC voltage so as to electrically sense contact with the pillar surface to avoid creating an external force on the vehicle body A that could influence the position or location of the Class A surface. The position detecting apparatus 20 moves into position against the body-in-white A to establish a cross-car location Y by touching the contact block 24, and a fore/aft X and up/down Z location by locating in the gage hole B. After each of the position detecting apparatuses 20 as shown in FIG. 1 have moved into place by finding their respective primary locating point on the vehicle, the position detecting apparatuses 20 are immobilized according to the teachings of Dacey, Jr. To a person skilled in the art it should be obvious that in order to establish the immobilized position of all four position detecting apparatuses 20, the vehicle body A must come to a complete stop position in the master locating station 10. The body-in-white A enters the master locating station 10 located on the same primary locating points as established in the framing system. These primary locating points are the same points used to locate the body throughout the body shop operations as well as in the body inspection room and generally includes locating on each of the rails, a four way locating pin forward and a two way locating pin rearward. The body-in-white A is then clamped in place and remains at the clamped position throughout the master locating stop station and subsequent assembly stations.

Figure 3:
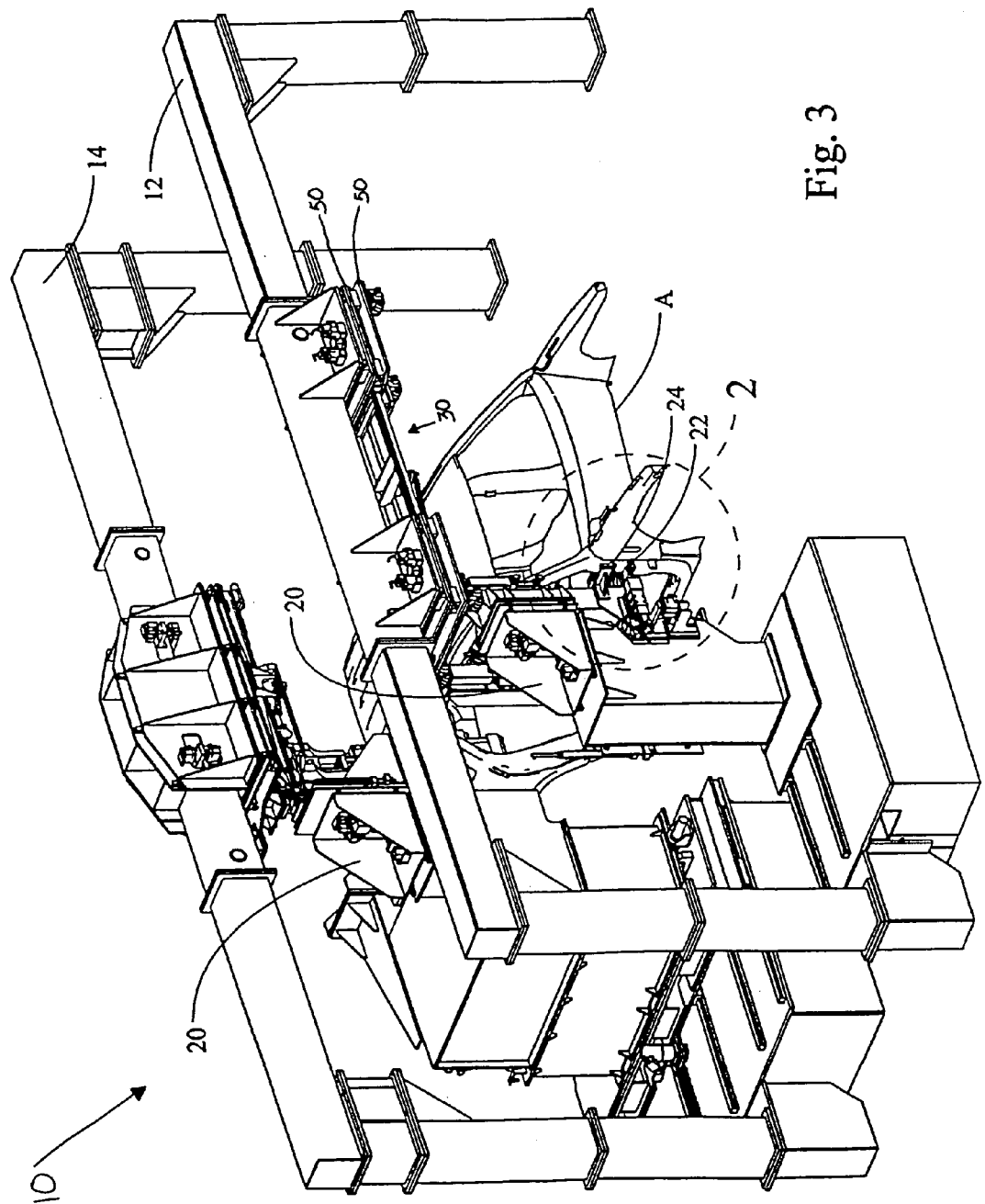
FIG. 3 is an isometric view of the master locating station with the right side position detecting apparatuses located on the right side primary locating points and the left hand position detecting apparatuses and all associated tooling removed.

For the purpose of clarity, and with reference to FIG. 3, there is shown a master locating station 10 with the appropriate gantries in the front 12 and rear 14 of the vehicle body A that straddle the production line as well as the position detecting apparatuses 20 used to locate on the right hand side of the vehicle body A. The remaining position detecting apparatuses 20 are not shown for the purpose of clarity. However, it is understood that the following discussion of the operation concerning the right front quarter position detecting apparatus 20 equally applies to each of the position detecting apparatus 20 in the creation of a new X, Y and Z coordinate or grid system based on the vehicle body A as built with the aforementioned variations, distortions and inherent processing errors. The work performing tools are also not shown in FIG. 3.

FIG. 3 represents a master locating station 10 that includes a front gantry 12 at the front of the body wherefrom is suspended a lever and crank centering mechanism 30 that can move fore/aft (X) and cross-car (Y) on a slide assembly 50 utilizing a plurality of bearings and ways in order to be moved in the fore/aft X and cross-car Y directions for a purpose hereinafter described. As shown in FIGS. 2 and 3, the position detecting apparatus 20 has been moved in place by the insertion of the probe 22 into a primary locating point or gage hole B in the vehicle body A pillar as well as by a contact block 24 creating contact with the vehicle body A Class A surface C so as to find and locate the exact position of the selected primary locating point for the front quarter panel of the vehicle body A. The position detecting apparatus 20 has been immobilized and is locked in this position. Since all position detecting apparatuses 20 operate simultaneously in order to establish the location of all of the primary locating points on a vehicle body A, once immobilized, all four position detecting apparatuses 20 are now positioned with respect to selected primary locating features on the processed body-in-white A. As recognized by any person skilled in the art, the primary locating points will vary between vehicle platforms and due to the distortions and stack up tolerances created in the framing and welding station, the position of the Class A surfaces C will also vary from body assembly to body assembly and even from side to side of the same vehicle body A, as will be illustrated hereinafter.

Figure 4:
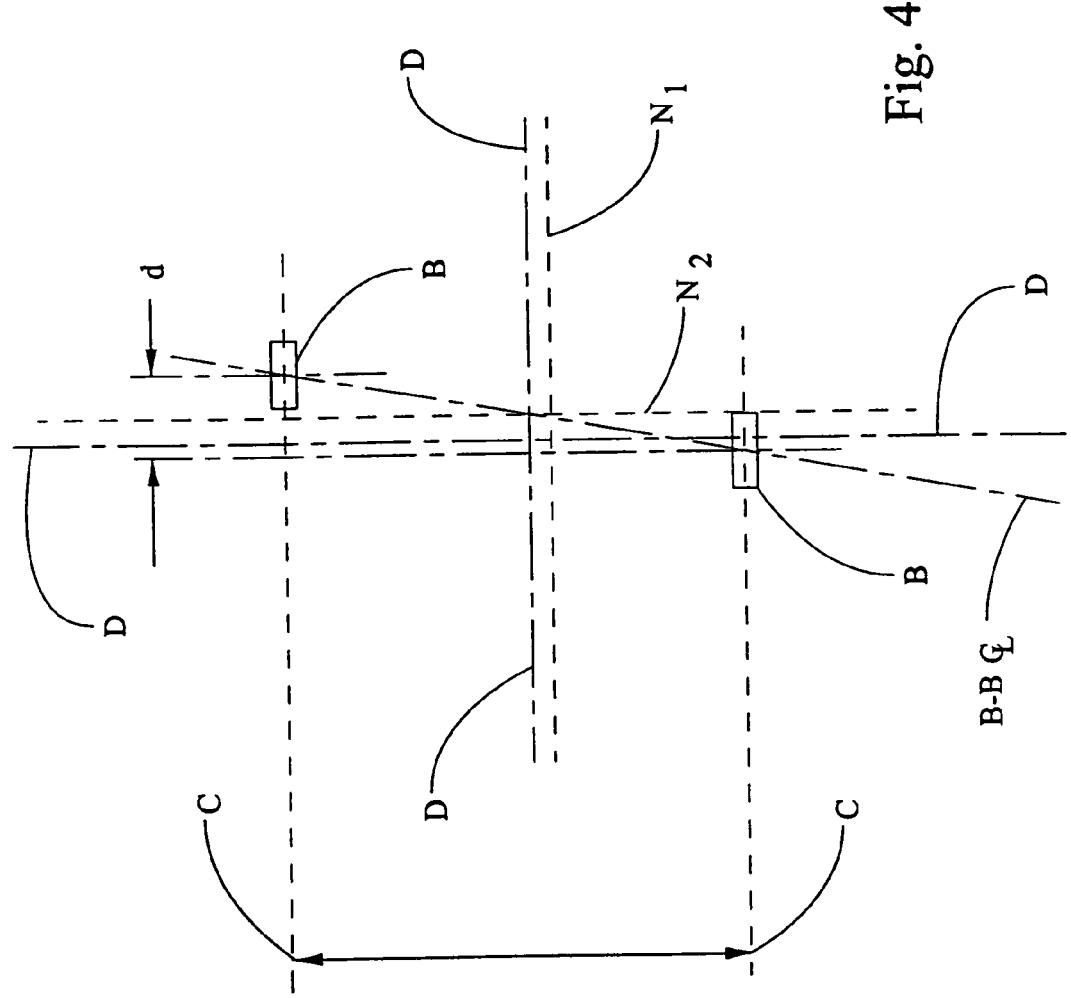
FIG. 4 is a schematic representation of the top view of the front primary locating points misaligned from design-intent due to the influences of the work performed on the body-in-white in the framing/welding station.
Figure 5:
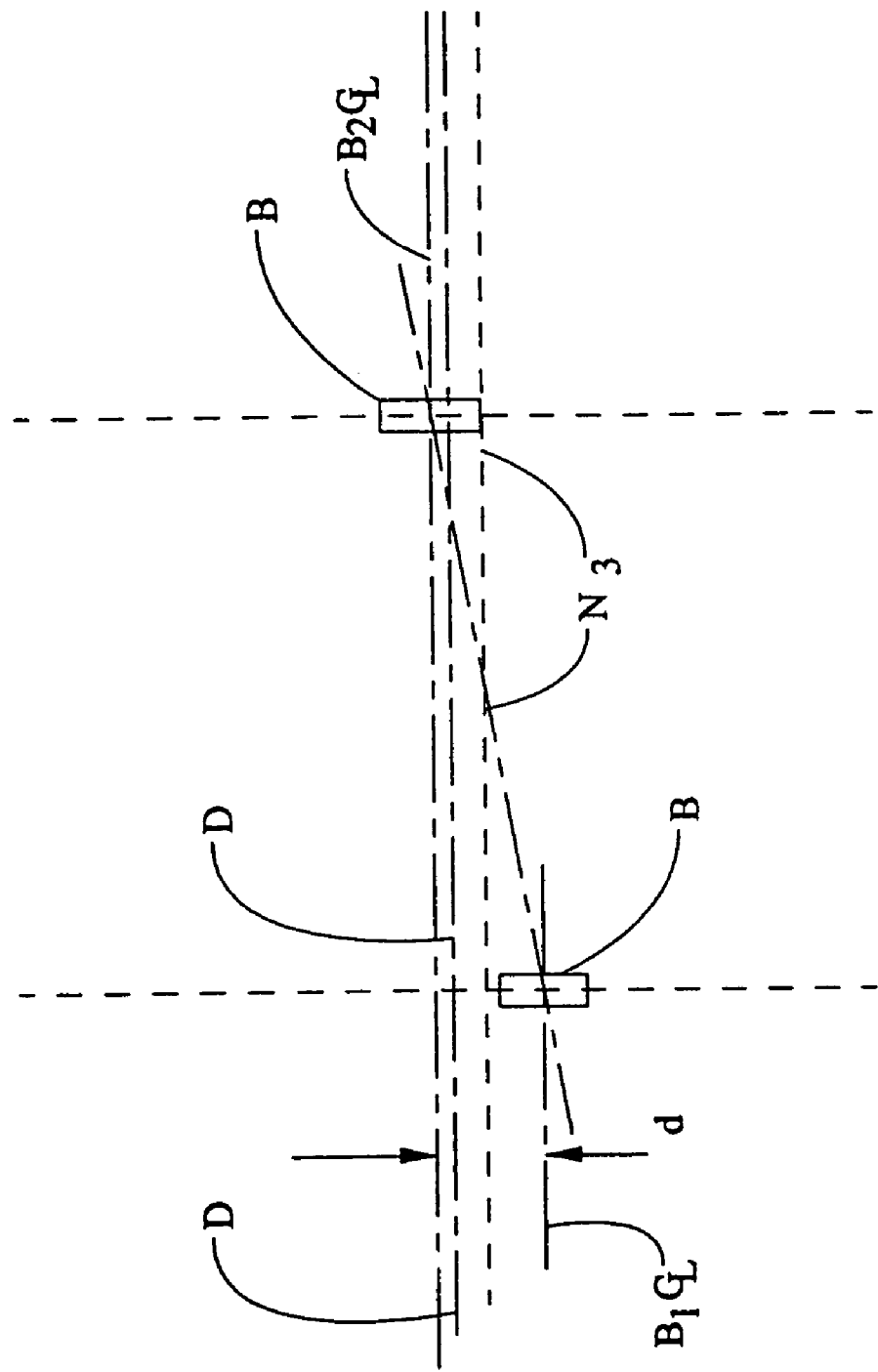
FIG. 5 is a schematic representation of a misalignment of the front primary locating points as viewed from the rear of the vehicle body so as to show the misalignment in the up/down direction of the primary locating points.

For the purpose of illustrating the invention, and with reference to FIG. 4, once the position detecting apparatuses 20 are immobilized, the representation conceptually in FIG. 4, as viewed from the top of the vehicle body A A, reflects the position of the right hand position detecting apparatus 20 as shown in FIG. 3 located at the primary locating point B, C in a direction fore/aft X further rearward from the position detecting apparatus 20 located on the left hand side of the vehicle body A A. From this, it can easily be concluded that the body-in-white A, as a result of distortions by processing through the framing station has moved. As a the gage hole B and associated cross-car centerline B–B G between the two primary locating points B, B has moved rearward from the cross-car design-intent centerline D while the gage hole B and associated centerline B–B G on the left hand side has moved forward from the cross-car design-intent position D. Also, in the cross-car direction Y, the contact blocks 24 from left to right hand side have detected a shift in the class A surface of C the pillar since the right hand side class A surface C of the pillar is further inboard from design-intent D while the left hand Class A pillar surface C is further outboard from its design-intent position as reflected by the cross-car design-intent centerline D. Similarly, FIG. 5 represents a conceptual view of the two front position detection apparatuses 20 located in the master gage hole B, as viewed from the rear of the vehicle body A. The centerline $B_1$ C, of the gage hole or primary locating point B on the left hand side is substantially lower than the centerline $B_2$ C, of the gage hole B on the right hand side of the vehicle body A. The obvious reason for this is the fact that the body-in-white A, as processed through the framing and welding station, has inherent variations and distortions in the various panels in which these primary locating points B are located and accordingly, these primary locating points B are not at design-intent position D nor in any way representative of the X, Y, and Z planes or grid lines about which the design-intent vehicle body A is designed. It is clear that the body-in-white A, due to its processing, has somehow been skewed in the FIG. 4 and FIG. 5 schematic representations. Any outer panel that references these primary locating points B, B as currently depicted in FIG. 4 and FIG. 5 will naturally require fit and spacing adjustments to adjacent body panels and this clearly shows why in the past, a slip plane had to be used in order to allow adjustment of these panels because of the unknown variations of the primary locating points B, B for attachments to or referencing of the outer body panels.

The invention contemplates adjusting the tooling with respect to adjusted averaged newly established X, Y and Z reference planes created by averaging out the distance d between right B and left B primary locating point as viewed in FIG. 4 or FIG. 5 so that the tooling can utilize this new adjusted average X, Y and Z grid positions to establish a new net reference location and perform work with respect thereto. The net effect of this averaging results in reducing total deviation error from design-intent D to one-half, as well as to establish an actual net location of the "as built" body-in-white A and utilize the newly established X, Y and Z coordinates as a new grid system from which to reference the tooling so that new net attachment points can be provided on the body-in-white A enabling the attachment of components to the vehicle body A at the new net attachment point without the need for oversized holes or a slip plane.

Figure 6:
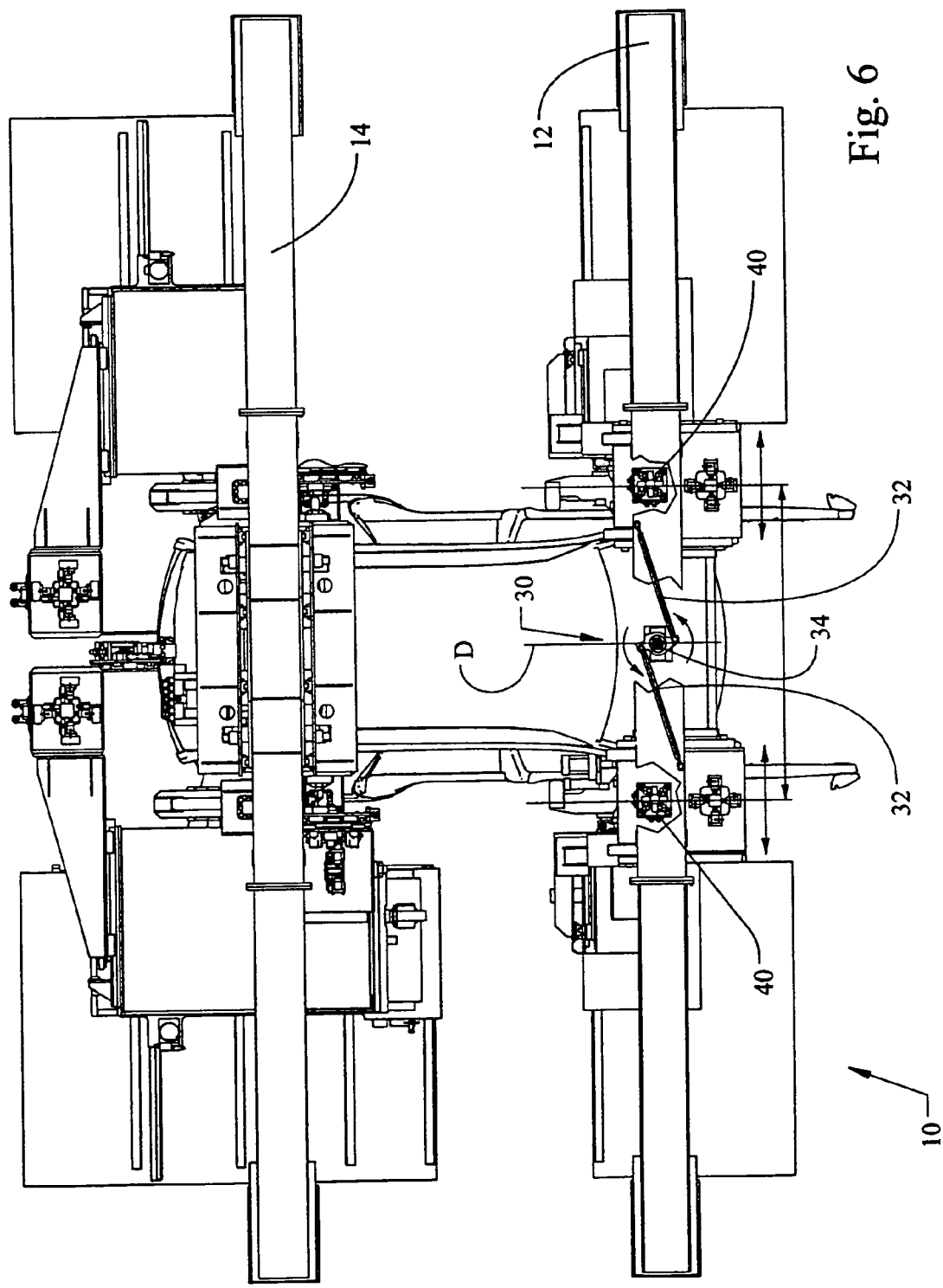
FIG. 6 is a top view of the master locating station with a portion of the front gantry cut away to better illustrate the attachment of the balancing lever and crank mechanism to the underside of the gantry spanning the production line.
Figure 7:
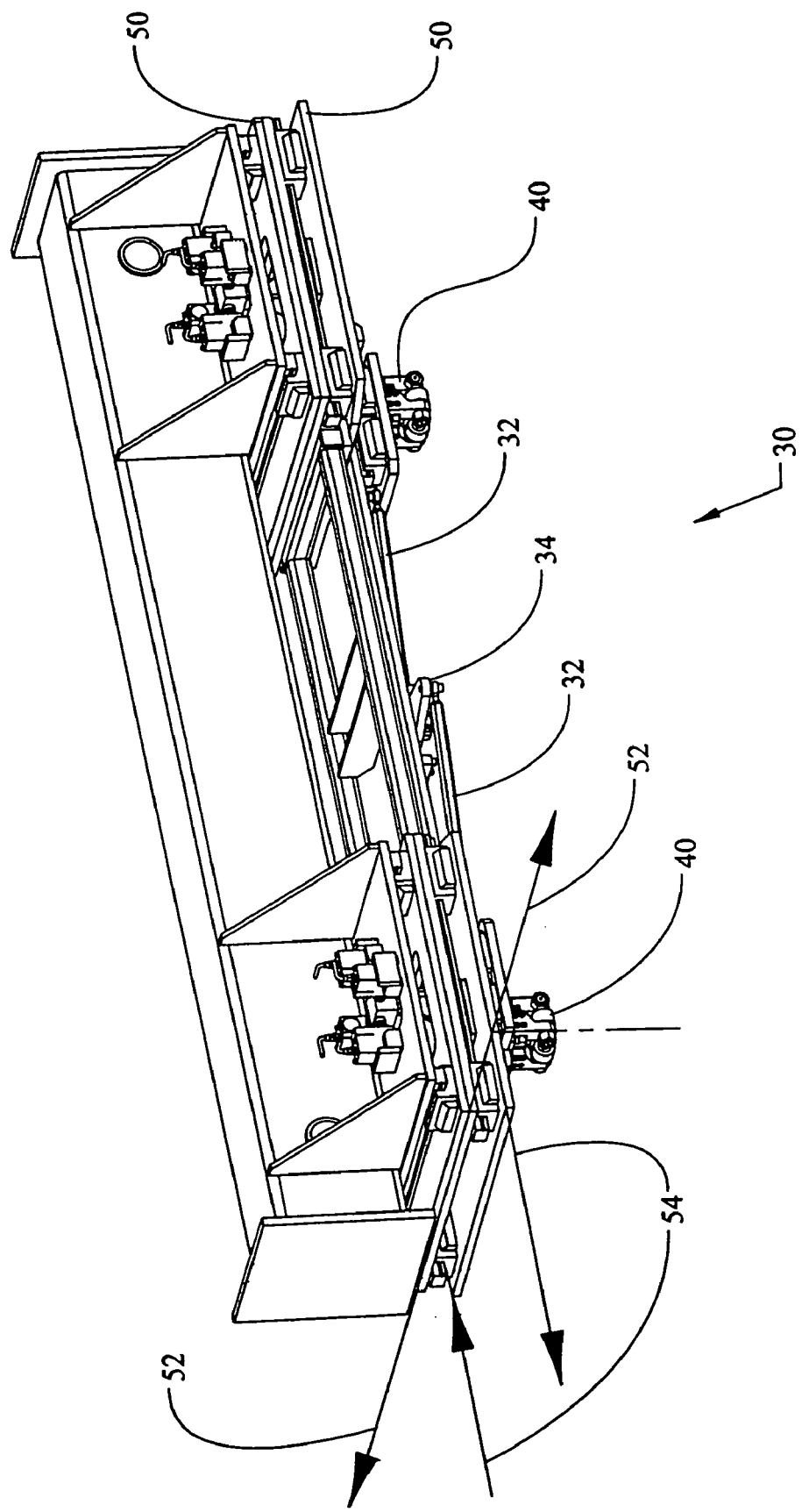
FIG. 7 is a partial view of the gantry spanning the production line, having the level and bell crank system attached to the bearing and slide mechanism that is secured to the underside of the gantry.

The new net locating X, Y, and Z coordinate system is established through the use of a lever and crank mechanism (or bell crank) 30 that is attached to each gantry 12, 14 for respective fore/aft and cross-car Y final positioning of attachment points. With reference to FIGS. 6 and 7, there is shown the lever and bell crank system 30 encompassing a crank arm 34 located at the exact design-intent centerline D of the vehicle body A to be processed with attached input sockets 40 located at the end of each lever 32 having one end attached to the input socket 40 and the opposite end attached to the crank arm 34. The lever and crank system 30 is biased in the clockwise direction so that the cross-car dimension between input sockets 40 is less than the design-intent dimension, by an amount corresponding to the acceptable total deviation range so as to always insure that the input socket 40 is within range of a locating pin to be moved into it, as hereinafter described.

Figure 8:
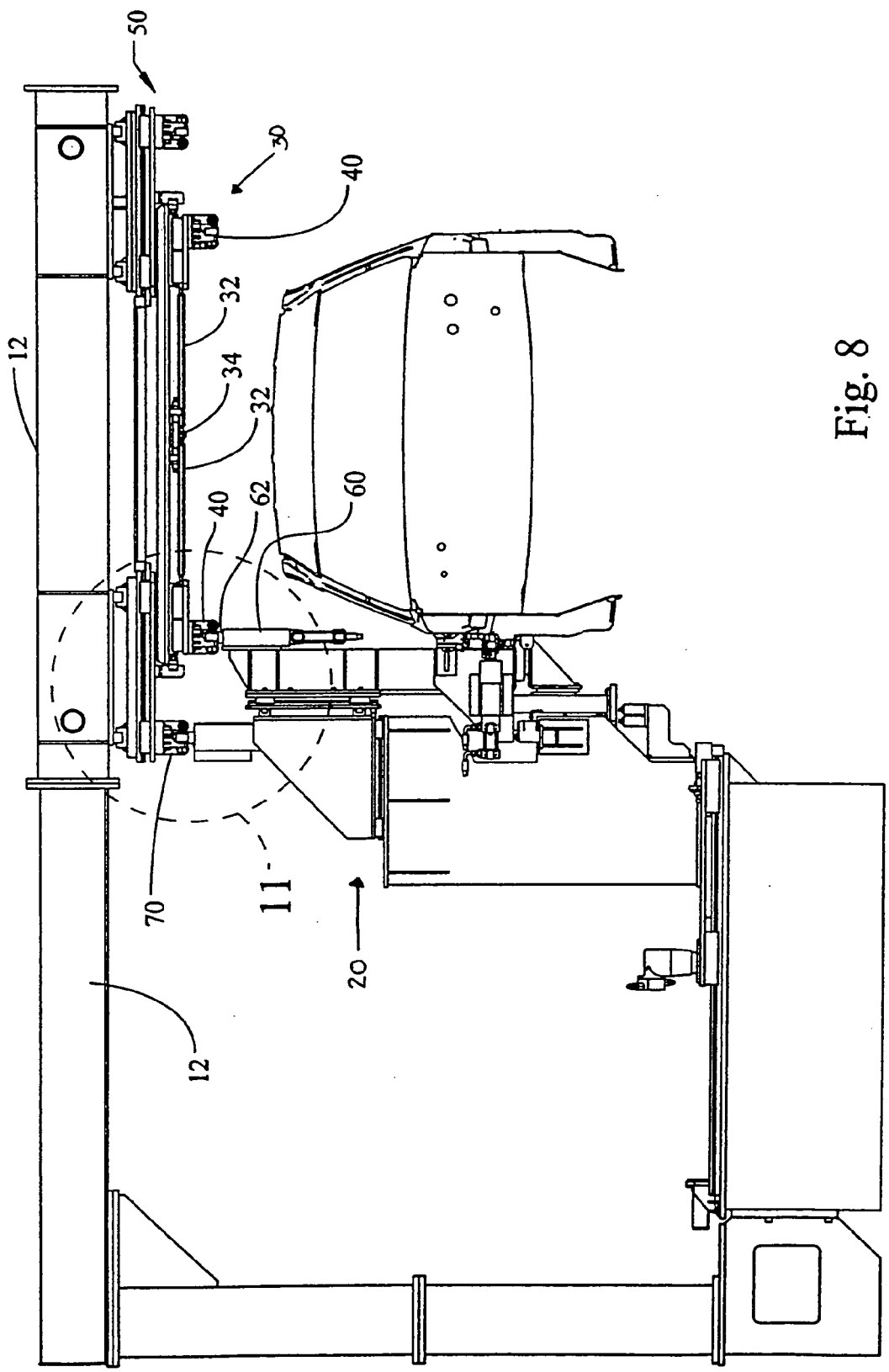
FIG. 8 is a front end view of the master locating station with the right side front position detecting apparatus, probes, and contact block locked in place and the associated locator pin inserted in the overhead socket to establish the location of a new X, Y, and Z coordinates for the primary locating points of the vehicle body.
Figure 9:
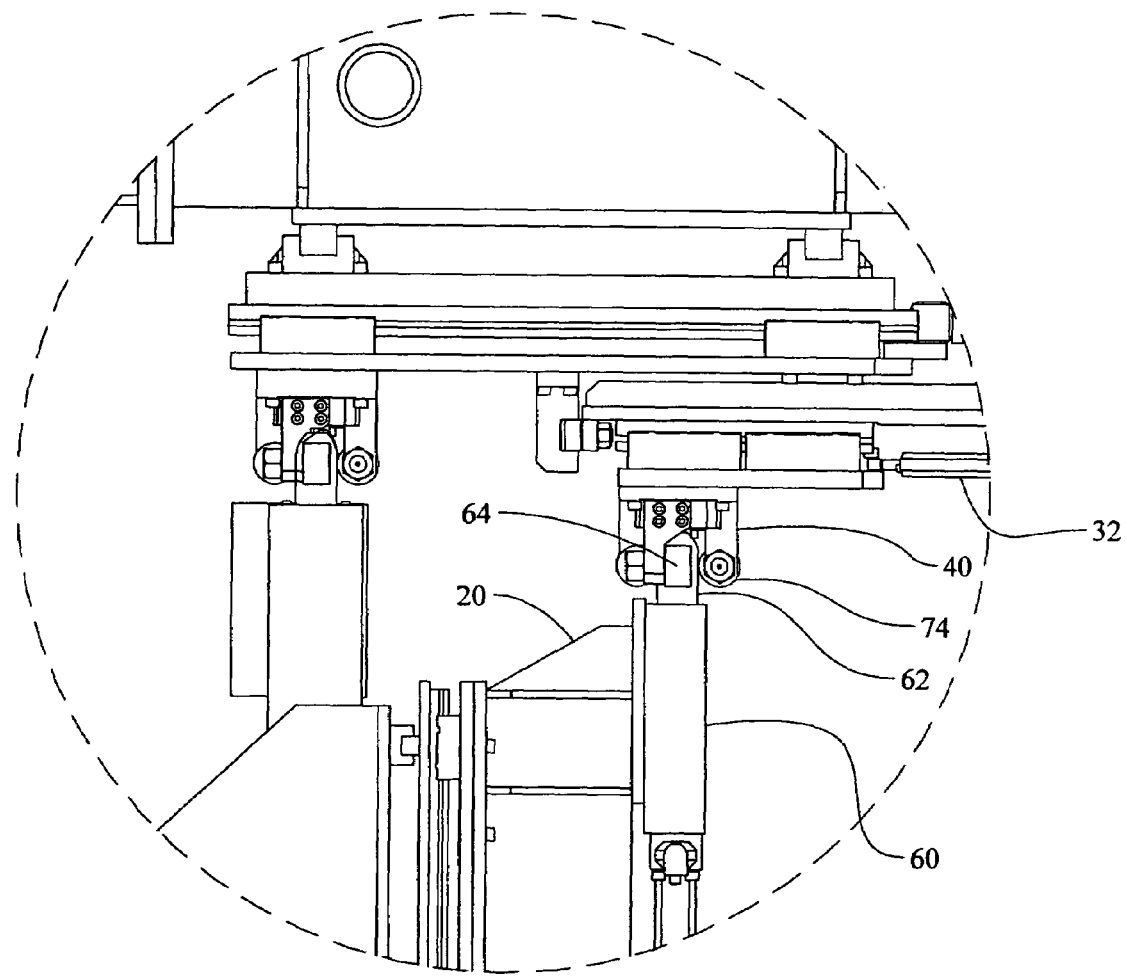
FIG. 9 is a detailed view of only the input socket arrangement attached to the end of a lever of the bell crank system with the locator pin in the bottomed-out position as shown in circle 11 of FIG. 8.
Figure 10:
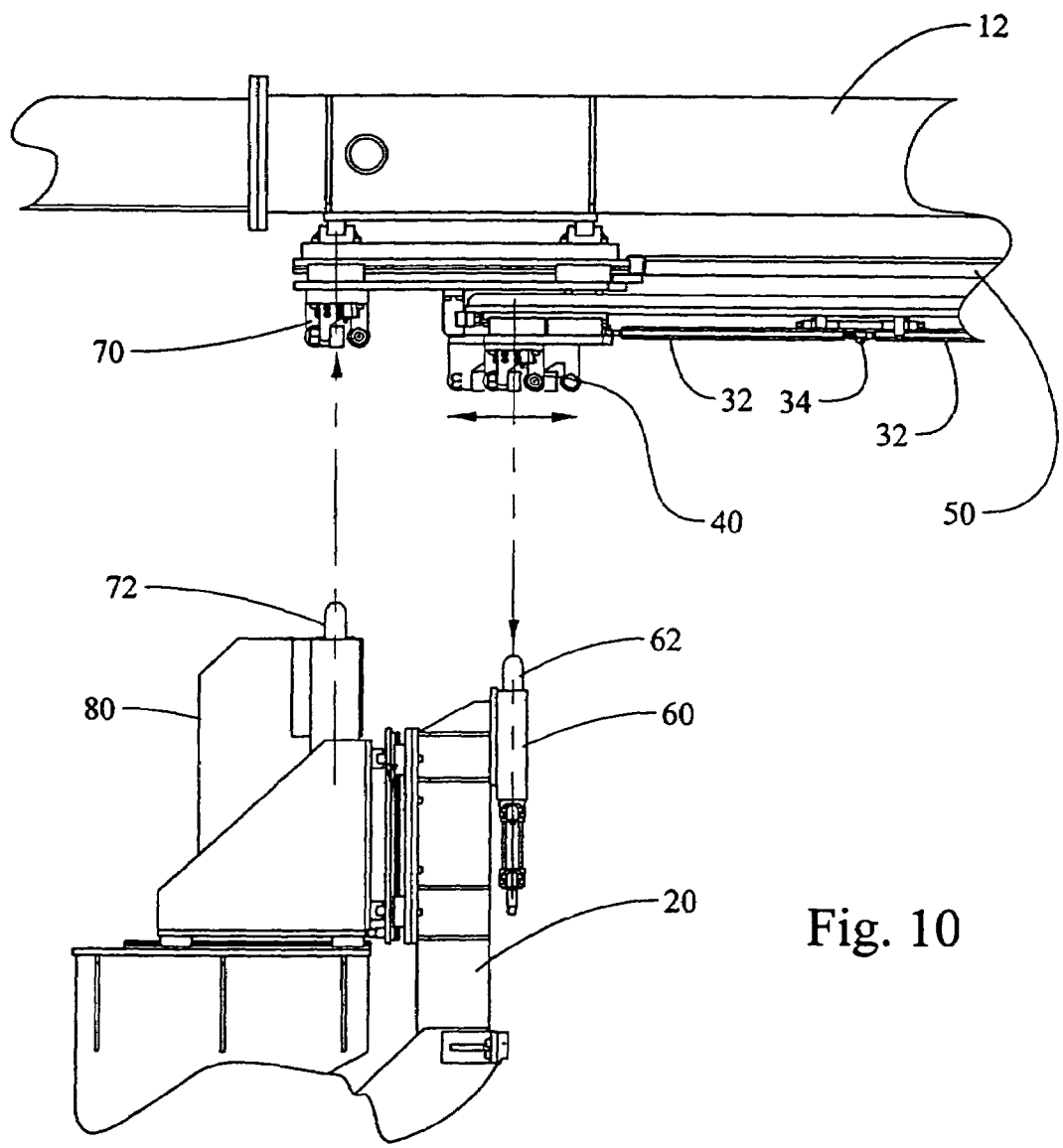
FIG. 10 is a partial view of the master locating station highlighting the lever and bell crank centering arrangement, having an input and output socket attached thereto with the respective locator pin aligned with a first position detecting apparatus and additional locator pin aligned with a second position detecting apparatus.
Figure 11:
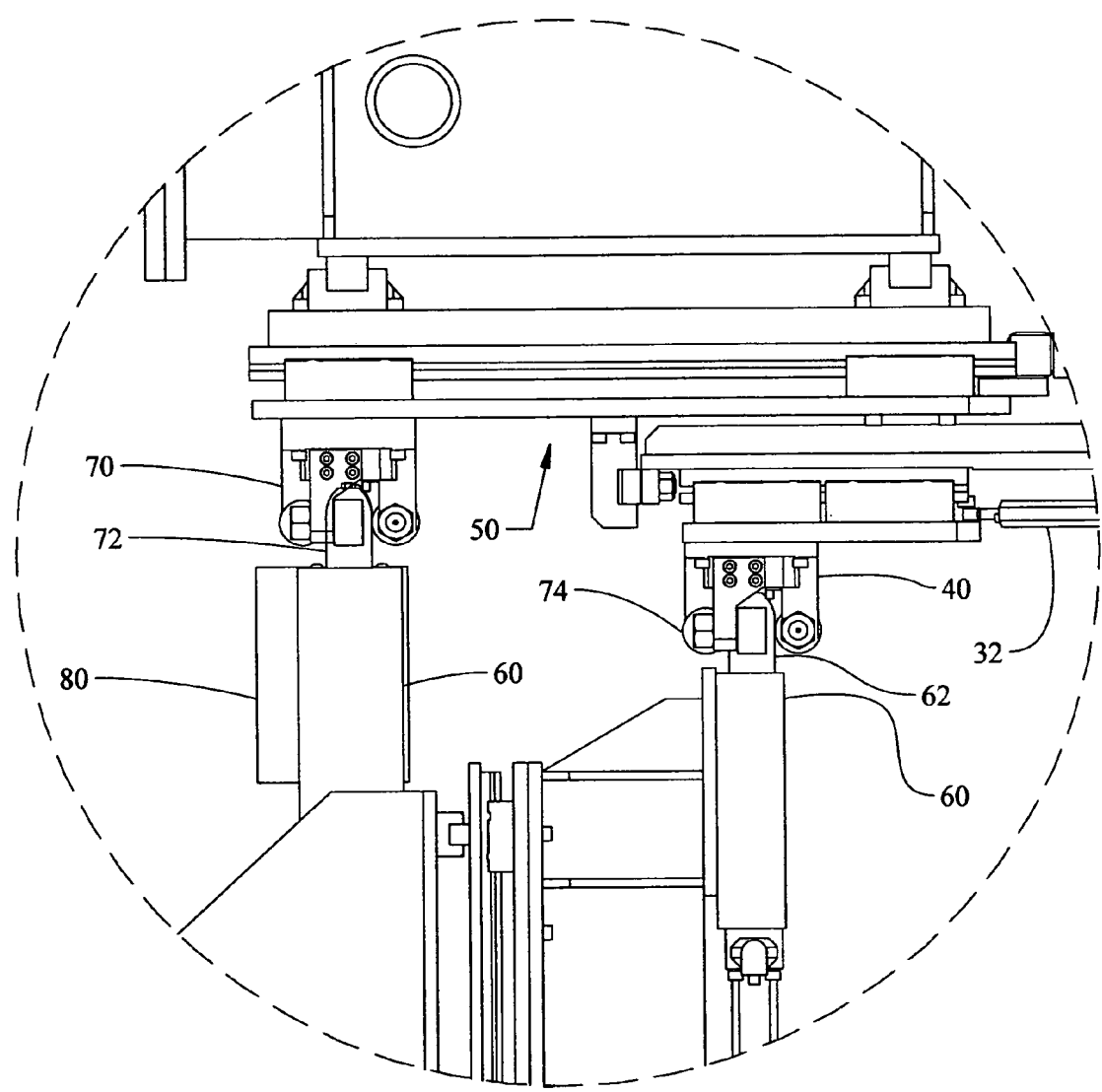
FIG. 11 is a detailed view in the fore/aft direction from the front of the vehicle body of both input and output sockets with locator pins bottomed-out as shown in circle 11 of FIG. 8.
Figure 12:
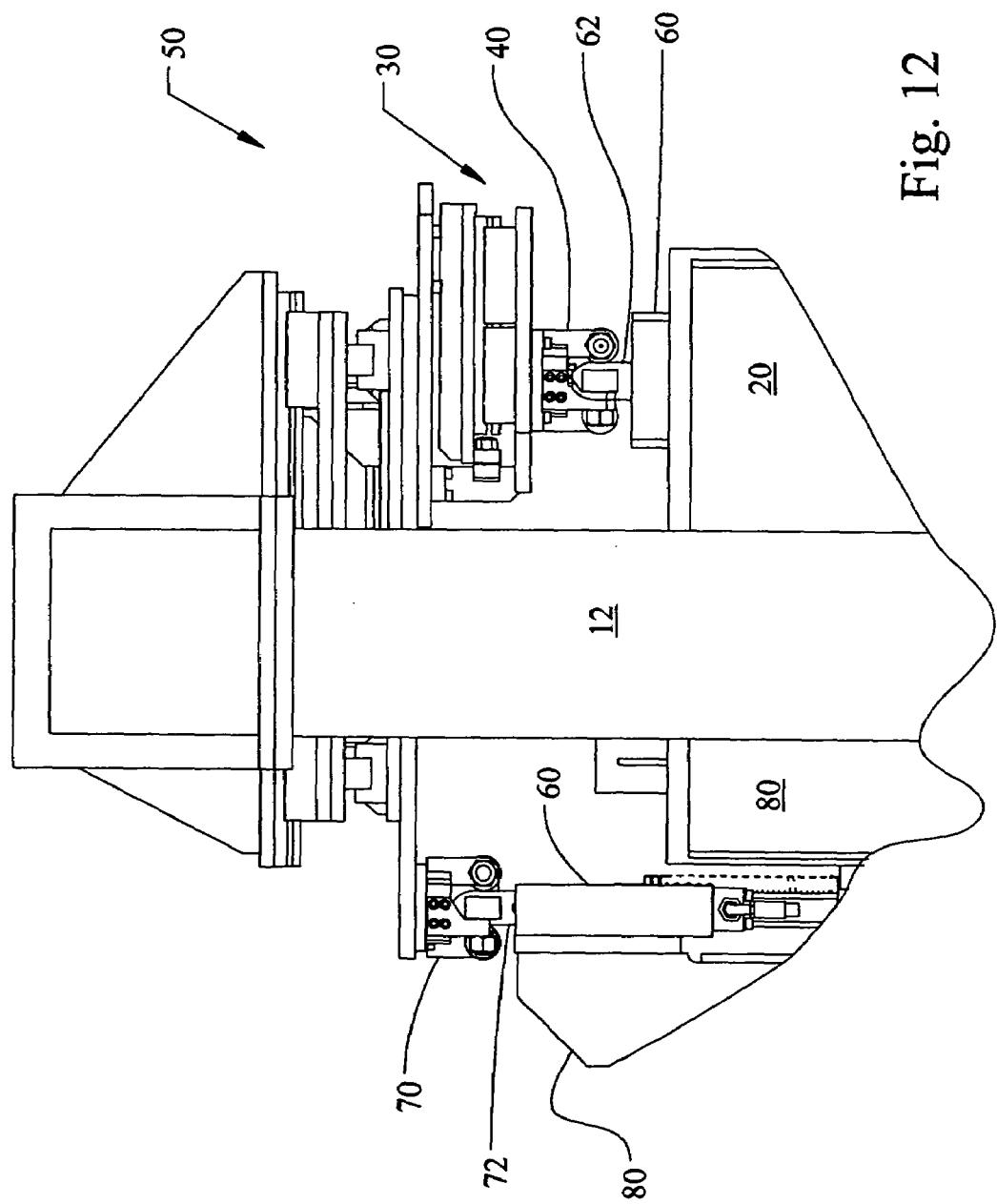
FIG. 12 is a partial view in the cross-car direction of the bearing and slide mechanism and associated input socket attached to a position detection apparatus and output socket attached to another position detecting apparatus directly attached to the tools, which perform work on the vehicle body.

Referring to FIG. 7, the first set of input sockets 40, are mounted on a bearing and a slide assembly 50 that is movable in the fore/aft direction 52 as well as cross-car direction 54 of the complete lever and crank system 30. The position detecting apparatus 20, shown in FIG. 8, communicates with the bell crank centering system 30 through the use of a locating pin 62 and cylinder 60 arrangement securely fixed to an opposite end of the position detecting apparatus 20. The locating pin 62 can extend from the cylinder 60 in an upward direction. As the locating pin 62 extends toward and into the input socket 40, a set of rollers 74 (shown in detail in FIG. 9) mounted 90° with respect to each other form a pocket to receive a bull nose of the locating pin 62 that continues to travel within the input socket 40 until it bottoms out. Any effect of a misalignment between flats 64 on the locating pin and the input socket 40 generates a force on the lever and bell crank system 30 thereby creating rotation of the bell crank and lever system 30 and, at the same time, the rotation forces movement of the slides along the bearings of the slide assembly 50 in the fore/aft 52 and cross-car 54 direction. Through the lever and bell crank mechanism 30, a balancing occurs between the two front input sockets 40 mounted on either side of the body-in-white A. Similar balancing occurs between the two rear sockets (not shown). The total amount of movement is a function of the total deviation from design-intent from which each of the primary locating points B have been moved to as shown in FIG. 4 and 5 due to the framing/welding station processing.

As shown in FIG. 4 and 5, the adjustment will be balanced between right and left sides because of the input socket 40 and locator pin 62 interaction and by this balancing action, the bell crank system 30 and slide mechanism 50 will balance out at a new net cross-car position and in effect create a new centerline $N_2$ in the fore and aft, or X direction, based on actual vehicle body A built conditions. Further, a second set of rollers 74 (not shown) within the input socket 40 also are influenced by the interaction of the locating pin 62 to create movement of the bearing and slide system 50 in the cross-car direction 54 to balance out at a new cross-car position and create a new cross-car centerline $N_1$ that is a net centerline for the actual vehicle body A as built in the cross-car or Y direction. A third movement of additional locator pins 62 inserted into associated input sockets 40 and related movement of the slide system 50 to which the bell crank system 30 is attached is simultaneous in both the front and rear of the vehicle body A A (not shown). Accordingly, when both locating pins 62 are fully inserted into the first set of input sockets 40, a new centerline for the body-in-white A, in the "as built" position, is created in the X and Y directions. A similar locating pin 62 and input socket 40 arrangement (not shown) is provided in the up/down or Z direction of the vehicle with a similar crank and lever mechanism 30 to accomplish a similar balancing affect (not shown) so that a new centerline $N_3$ or net locating line for the Z direction is established as illustrated in FIG. 5. Upon complete insertion of the locating pins 62, in their respective input sockets 40, a limit switch detects the presence of the pin 62 and securely locks the pins 62 in place in the first input sockets 40.

Now that the variation of the inherent errors of the processing of the body-in-white A has been balanced out or averaged across a new set of X, Y and Z centerlines, as discussed above, and the locator pins 62 have bottomed out in their respective input sockets 40 the work performing tools (not shown) can be brought into place to perform work on the body-in-white A. This is accomplished by providing an additional set of sockets 70, commonly referred to as, output sockets as shown in FIGS. 8–12.

An additional set of output sockets 70 are physically attached to the same slide and bearing assembly 50 mounting plate as the first set of input sockets 40 attached to the bell crank and lever system 30. An additional or second position detecting apparatus 80, directly attached to all of the tools that surround the body-in-white A, is spaced relative to the first position detection apparatus 20. Accordingly, as the additional position detecting apparatus 80 floats to permit complete insertion of a locator pin 72 in the output socket 70 the tooling will relocate itself with respect to the new X, Y and Z gridlines for the vehicle body A as built. This second set of sockets 70 receives the locator pins 72, of additional position detecting apparatus 80 located adjacent to the immobilized position detecting apparatus 20. Since the output sockets 70 are fixed to the bearing and slide structure 50 as the locator pins 72 are located or floated into the fixed output sockets 70, the additional position detecting apparatus 80 floats in all 3 directional planes X, Y, and Z to allow the pins 72 to completely position themselves and bottom out in the sockets 70.

As the second position detecting apparatus 80 floats into place the complete tooling system directly or indirectly attached to the second position detecting apparatus 80 will also float so as to position itself net with respect to X, Y and Z coordinates and relative to the new centerlines $N_1$, $N_2$, $N_3$, based on the actual built condition of the body-in-white A. When the locator pins 72 bottom out in the output sockets 70, a signal is generated and communicated to the second position detecting apparatus 80 so as to immobilize this apparatus in this position thereby establishing a net location for all work performing tools relative to the new net coordinate system, that is, X, Y and Z that reflects the actual vehicle body A as built wherein the total variations and distortions of the selected primary locating points B have been averaged out to set a new net position from which tools can perform work on the body-in-white A.

The work to be performed on the body-in-white A and the sequence in which to perform the work can vary. Generally, a person skilled in the art will recognize that the speed at which this work is accomplished is a direct function of the access that is created for each of the work performing devices. The majority of the work concerns piercing holes for attachment of outer body panels such as doors, decklid, liftgate, bumpers, facia, hood, and fenders. However, it is also contemplated that attachment features can be established for head lamps, shock towers, tail lamps, fuel filler, instrument panel, seats, consoles and the like. All of the work performing tools operate under principles that need not be described herein.

While the method and apparatus of the invention has been described by way of illustration involving 4 position detecting apparatuses 20 in conjunction with two lever and crank centering systems 30 to balance out and establish a new X, Y and Z reference coordinate system for a body-in-white A, it is within the purview of the present invention to establish and immobilize any two or more position detecting apparatuses 20 and an associated lever and crank balancing or averaging mechanism, thus, creating a new X, Y and Z grid system or reference planes from which useful work can be performed.

Figure 13:
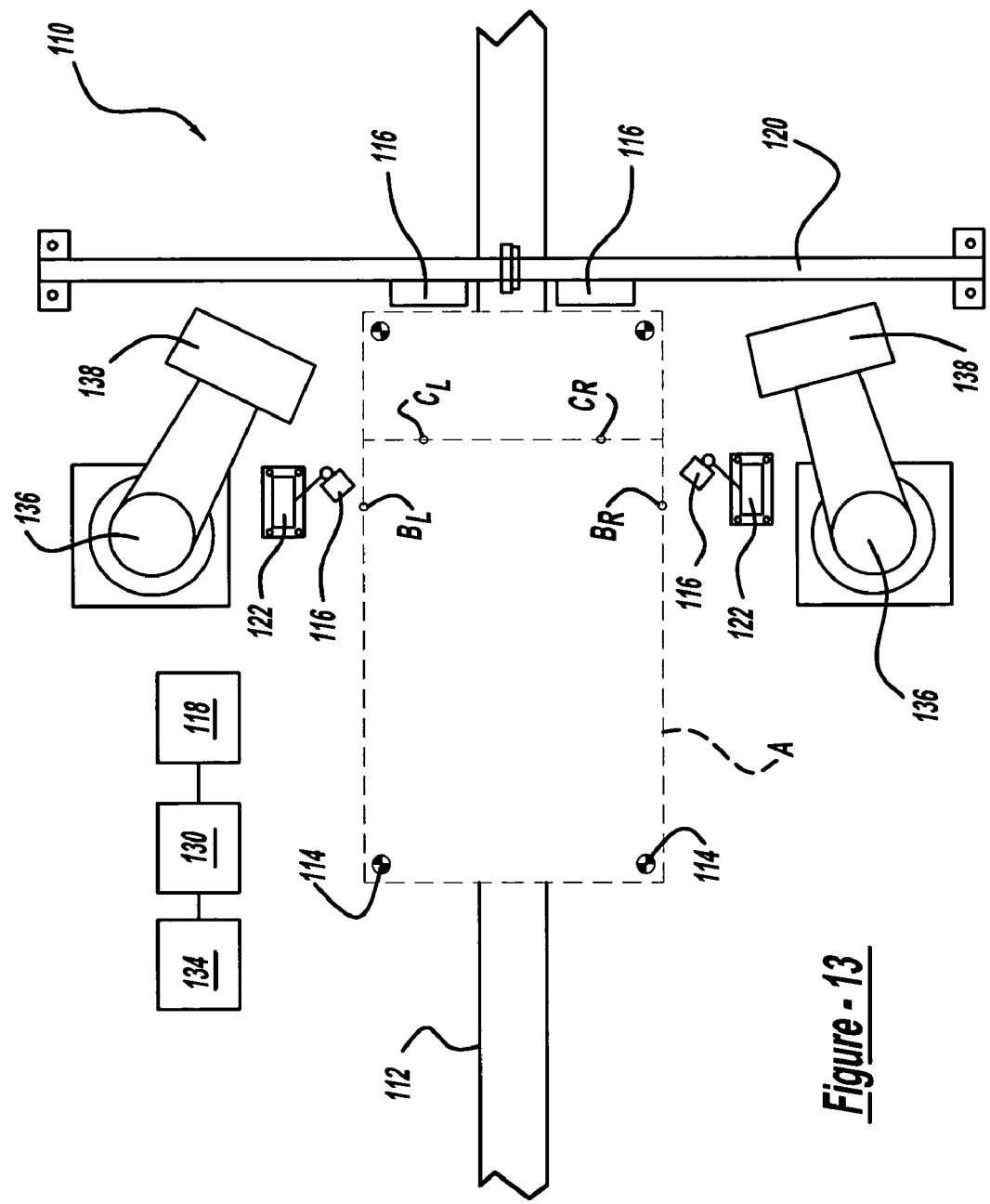
FIG. 13 is a top view of a partial body-in-white located in a workstation showing electro-optical position detecting apparatuses, which are engaging with the vehicle body.

As stated previously above, it is within the scope of the present invention that the position detecting apparatus 20 can also take the form of an optical sensor such as a laser. Accordingly, FIG. 13 illustrates a plan view of an alternative embodiment of the present invention that represents an electro-optical analog to the mechanical embodiment described previously with reference to FIGS. 1 through 12. Whereas, the previously described embodiment mechanically re-established a coordinate system for an as-built vehicle body A, this embodiment, using a microprocessor, electro-optically re-establishes a coordinate system for an as-built vehicle body A so that work can be performed by tooling directed by programmable robots.

FIG. 13 generally illustrates a workstation 110 for processing a body-in-white, or vehicle body A A. The workstation 110 is ultimately directed to forming net-located attachment features programmed by comparing as built positions with design-intent positions and establishing a new net or best fit attachment feature on the vehicle body A A, regardless of the as built location of the vehicle body A A. In other words, the objective of the workstation 110 is to net-locate such attachment features with respect to a newly established net grid system relative to design-intent vehicle body coordinates, regardless of the position, location, or orientation of the body-in-white coordinates after the effects of the framing/welding operation. The present invention is particularly effective if the actual vehicle body A coordinates of actual or target locating features $B'_L$, $B'_R$, $C'_L$, $C'_R$ (see FIGS. 15 and 16) are within tolerance. If, however, the target locating features $B'_L$, $B'_R$, $C'_L$, $C'_R$ are not within their predetermined tolerance band coming into the workstation 110, then the present invention is not designed to correct for such out-of-tolerance conditions and the vehicle body A may need to be rejected and repaired. As defined herein, the terminology—target locating feature—is equivalent to the terminology primary or actual locating feature. Also as defined herein, an attachment feature can be an attachment point, surface, position and the like. Likewise, a target locating feature can be a locating point, surface, position, and the like.

The workstation 110 is just one station of a much larger vehicle assembly line. The vehicle body A A may arrive at the workstation 110 in any manner including on a sled, conveyor 112, or the like. Preferably, once the vehicle body A A occupies a desired position within the workstation 110, locator pins 114 engage preformed setup locating features (not shown) on the vehicle body A such as on an underside of the vehicle body A A near the four corners thereof, as is well-known in the art. Two-way and four-way locator pins (not shown) could also be used as described above with respect to the mechanical embodiment. The locator pins 114 are permitted to float to a certain extent to accommodate dimensional variations in the predefined locating points on the vehicle body A.

Figure 14:
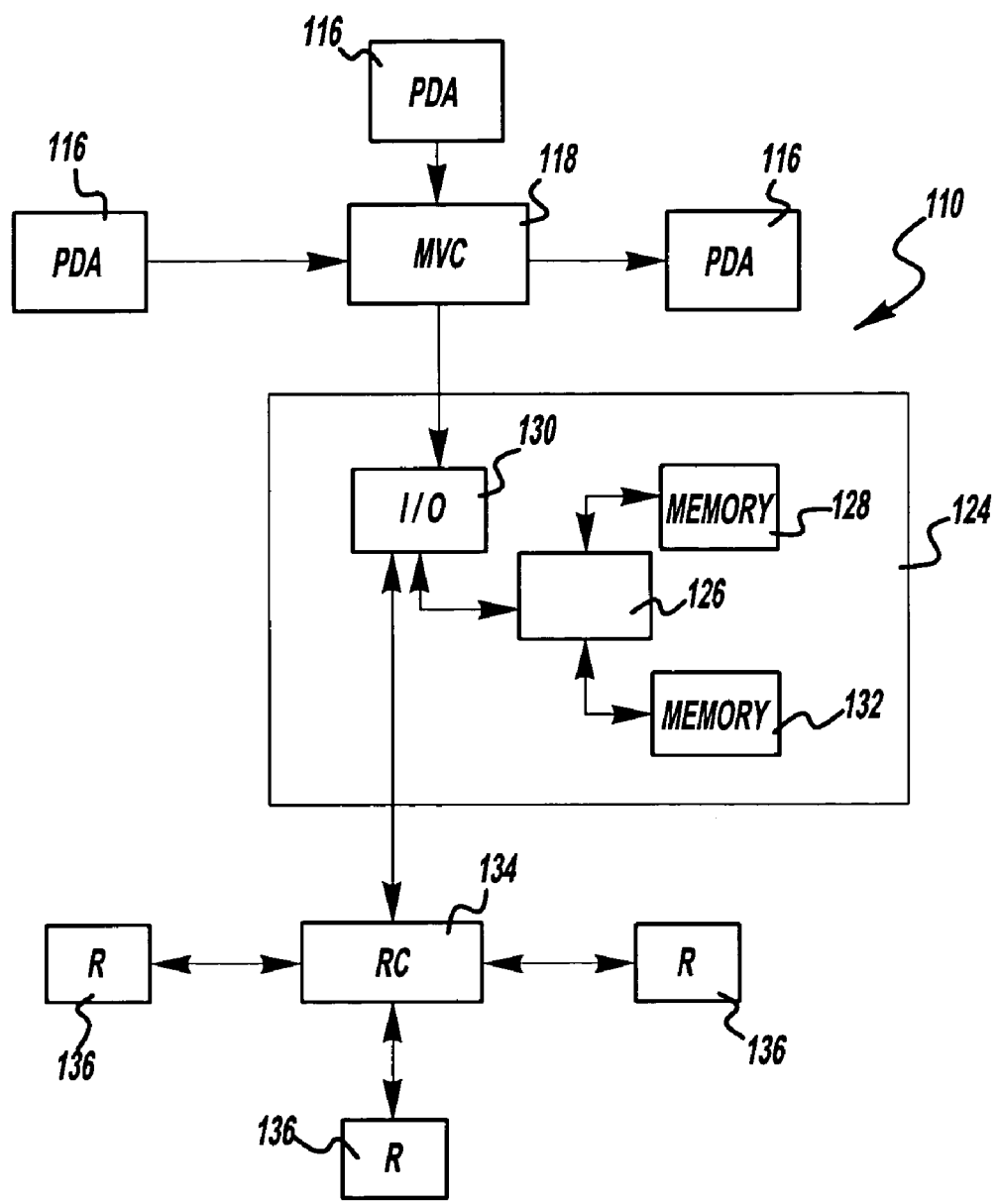
FIG. 14 is a block diagram of associated electronics of the workstation of FIG. 13.

The workstation 110 also includes several position detecting apparatuses 116 that are interfaced to a common machine vision controller 118 as shown in FIG. 14. A pair of up/down position detecting apparatuses 116 are mounted to an overhead frame 120, under which the vehicle body A A is stationed. An additional pair of cross-car and fore/aft position detecting apparatuses 116 are mounted to opposed floor stanchions 122, between which the vehicle body A is stationed. The position detecting apparatuses 116 are preferably PERCEPTRON robot guidance sensors, which are well-known in the art and are exemplified in U.S. Pat. No. 4,645,348, which is incorporated by reference herein. In brief, each position detecting apparatus 116 includes a light source, such as a laser diode, that is modified to generate a structured light pattern for illuminating target locating features on a target object. The structured light pattern is preferably projected onto the target locating features at an angle that is normal to the target feature. As defined herein, a locating feature is equivalent to a locating point or surface. A sensor device within the position detecting apparatus 116 receives a reflected light image through a set of sensor optics, such as photo-diodes, which transduce the reflected light image into electrical signals whose signal values are approximately proportional to the intensity of the incoming light. Each position detecting apparatus 116 is calibrated in reference to known X, Y, and Z Cartesian coordinate hardpoints within the workstation, such as the vehicle body A locator pins 114. Calibration and setup methods are well known in the art and are exemplified by U.S. Pat. No. 4,841,460, which is incorporated by reference herein. Also, calibration and setup procedures may be carried out using AUTOCAL or DYNACAL, available from Dynalog, Inc. of Bloomfield Hills, Mich.

Referring now to FIG. 14, there is provided an illustration of one embodiment of the present invention in block diagram form. The position detecting apparatuses 116 are all coupled to the machine vision controller 118, which processes electro-optical signals from the position detecting apparatuses 116. The machine vision controller 118 compares the received electro-optical signals to calibration reference data to yield actual X, Y, and Z Cartesian coordinate data that are representative of the actual as built location of the target locating features.

The machine vision controller 118 is also coupled to a central processor 124, which executes a predefined best-fit algorithm on the coordinate data from the machine vision controller 118. It is contemplated that the central processor 124 could be incorporated within the machine vision controller 118 and need not be a separate device. In any case, the central processor 124 includes a controller 126, memory 128, and interface electronics 130. The interface electronics 130 may conform to protocols such as RS-232, parallel, small computer system interface, and universal serial bus, etc. The memory 128 can be RAM, ROM, EPROM, and the like. The controller 126 may be configured to provide control logic that provides output instructions. In this respect, the controller 126 may encompass a microprocessor, a micro-controller, an application specific integrated circuit, and the like. The controller 126 may be interfaced with an additional memory 132 that is configured to provide storage of computer software that provides the best-fit algorithm and that may be executed by the controller 126. Such memory 132 may also be configured to provide a temporary storage area for data received by the central processor 124 from the machine vision controller 118.

Using the predefined best-fit algorithm, the function of the central processor 124 is to calculate an actual as built vehicle body A reference feature of some type, such as an actual vehicle body A centerline or gridline, or an actual vehicle Cartesian coordinate map or wireframe, and the like. The best-fit algorithm determines an imprecise distance between as built features and design-intent locations and divides such distance in half to establish the new gridlines or centerlines for the actual body-in-white A in the as built condition thereby reducing the error of the location of such feature by one-half from its design-intent-location. In the previous embodiment, such "calculation" was carried out by mechanical floating input sockets 40 and a mechanical lever and crank mechanism 80. One example of the best-fit algorithm can be better understood with reference to FIGS. 15 and 16, which illustrate conceptual representations of the vehicle body A A.

Figure 15:
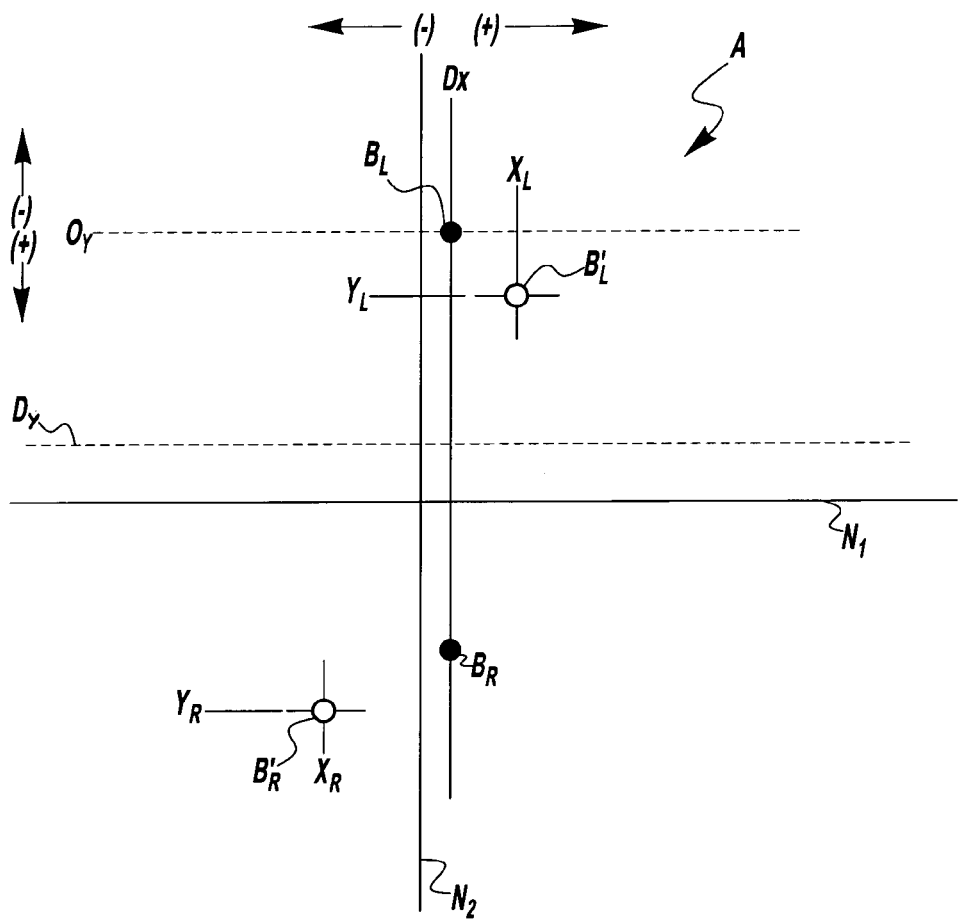
FIG. 15 is a schematic representation of the top view of the primary locating points misaligned from design-intent due to the influences of the work performed on the body-in-white in a framing/welding station and the new grid established as a result of averaging out the total deviation from design-intent of the actual location of the primary as built locating points.

FIG. 15 illustrates a conceptual view of the top of the vehicle body A wherein a design-intent locating feature $B_L$ represents a point, surface, or the like on a left side of the vehicle body A A and design-intent locating feature $B_R$ represents a point, surface, or the like on the right side of the vehicle body A. The features $B_L$, $B_R$ are preferably located symmetrically cross-car Y and may consist of hinge mounting points on A-pillars, leading edges of doors that are already mounted to the vehicle body A, and the like. Actual locating features $B'_L$ and $B'_R$ are misaligned or displaced from the design-intent locating features $B_L$ and $B_R$ (as shown in exaggeration for clarity) due to tolerable dimensional variances of the actual vehicle body A from a theoretical design-intent vehicle body A, such as those variances induced by framing and welding stations upstream from the workstation 110.

Datum $D_x$ is a centerline created through design-intent locating features $B_L$ and $B_R$. Similarly, datum $O_y$ is a centerline through design-intent locating feature $B_L$ that is parallel to the theoretical centerline $D_y$ of the theoretical design-intent vehicle body A. The terms datum, centerline, and net reference feature are used herein interchangeably because all commonly relate to things from which other coordinates are referenced. Moreover, the term centerline is equivalent to the terminology median feature, median point, or median surface. In any case, datums $D_x$ and $O_y$ intersect to define a theoretical Cartesian origin from which the locations of the actual locating features $B'_L$, $B'_R$ can be referenced. The actual locating features $B'_L$ and $B'_R$ each have X and Y Cartesian coordinates components, wherein actual locating feature $B'_L$ includes components $X_L$ and $Y_L$, while actual locating feature $B'_R$ includes components $X_R$ and $Y_R$. Thus, the amount of error due to processing events can be measured and the locations of the actual locating features $B'_L$ and $B'_R$, can be determined by mathematical reference to the datums $D_x$ and $O_y$. Similarly, the location of a cross-car centerline $N_1$ of the actual as built vehicle body A can be calculated by averaging the Y components of the actual as built locating features $B'_L$ and $B'_R$. Expressed as an equation, this calculation amounts to $(Y_L+Y_R)/2$. Expressed as a concept, the calculation amounts to balancing out the locational errors of two features, between the features, to create a best fit condition regardless of previous built-in vehicle body A errors. Also, location of a fore-aft centerline $N_2$ of the actual as built vehicle body A can be calculated by averaging the X components of the actual locating features $B'_L$ and $B'_R$. Expressed as an equation, this calculation amounts to $(X_L+X_R)/2$. It is contemplated that the present invention could use multiples of specific actual locating features $B'_L$, $B'_R$, $C'_L$, $C'_R$, along each side of the vehicle body A to provide even higher accuracy for developing the net reference features such as centerlines and the like for the attachment of components to the as built body-in-white A after framing and welding operations are completed.

Figure 16:
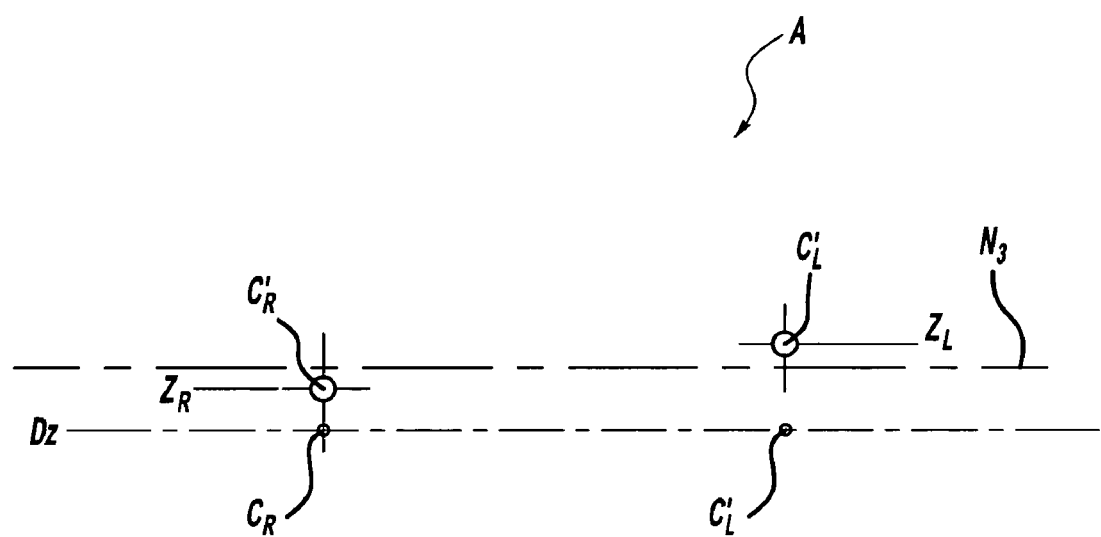
FIG. 16 is a schematic representation of a misalignment of the primary locating points as viewed from the front of the vehicle body so as to show the misalignment in the up/down direction of the primary locating points and the establishment of a new grid centerline at one-half the total deviation of the as built location as compared to design-intent location.

Like FIG. 15, FIG. 16 represents a conceptual view of the vehicle body A, but from the front of the vehicle body A A looking rearward. Design-intent locating feature $C_L$ represents a point, surface, or the like on a right side of the vehicle body A, and design-intent locating feature $C_R$ represents a point, surface, or the like on the left side of the vehicle body A as viewed. The design-intent locating features $C_L$, $C_R$ are preferably located symmetrically opposed and may be points or surfaces on a motor compartment cross-member, a radiator rail, or the like. Actual locating features $C'_L$ and $C'_R$ are misaligned or displaced as a result of processing from the design-intent locating features $C_L$ and $C_R$ due to tolerable dimensional variances of the actual vehicle body A, such as those variances induced by upstream framing and welding stations.

Datum $D_z$ is a centerline created through design-intent locating features $C_L$ and $C_R$. Datum $D_z$ defines a theoretical one-dimensional origin from which the locations of actual locating features $C'_L$ and $C'_R$ can be determined. The actual locating features $C'_L$ and $C'_R$ each have Z Cartesian components. Actual locating feature $C'_L$ includes component $Z_L$, while actual locating feature $C'_R$ includes component $Z_R$.

Thus, the locations of the actual locating features $C'_L$ and $C'_R$, can be calculated by dimensional reference back to datum $D_z$. Similarly, the location of a theoretical up/down net locating line or centerline $N_3$ of the actual vehicle body AA can be calculated by averaging the Z components of the actual locating features $C'_L$ and $C'_R$. Expressed as an equation, this calculation amounts to $(Z_L+Z_R)/2$. Expressed as a concept, the calculation amounts to balancing out any locational error between two locating feature points in the Z coordinate direction to create a best-fit condition regardless of previous built-in vehicle body A errors and regardless of the design-intent locations.

It is contemplated that the present invention may include other more complex methods of establishing the locations of the target locating surfaces $B'_L$ and $B'_R$ and the adjusted net reference features or centerlines $N_1$, $N_2$, and $N_3$ that they establish. For example, the central processor 124 may store a predefined design-intent wireframe data model that has millions of X, Y, and Z Cartesian coordinate data points that represent the surface contours of a design-intent vehicle body A. The design-intent wireframe data model may also include reference datums, from which the locations of actual locating features can be referenced on a coordinate-by-coordinate basis. The wireframe data model can be offset from its design-intent condition, to a wireframe representation of the actual vehicle body A as sensed by the position sensing apparatuses. In other words, the position sensing apparatuses can establish a relatively small amount of actual vehicle body A coordinates, which can be established as datum points relative to the design-intent wireframe data model so as to replace corresponding data points in the design-intent wireframe data model. Then, the controller 126 can run a program to adjust, or pull, all of the remaining design-intent or design-intent grid data points into correspondence with the actual data points to reestablish a new as built grid system for each entire vehicle body A after it is processed past the framing/welding station. In other words, the few actual vehicle body A coordinates can be extrapolated in reference to the wireframe data model reference datums to generate actual wireframe data of the actual vehicle body A coordinates. From the actual wireframe data, vehicle body A centerlines, or any other types of reference features, can be generated.

Referring again to the block diagram of FIG. 14, a robot controller 134 receives the output instructions from the central processor 124 and thereby renders movement instructions to robots 136, such as NACHI SC300F robots. The present invention adjusts the robots 136 with respect to newly established net best fit reference features or centerlines $N_1$, $N_2$, and $N_3$ created by averaging out the distances between actual as built locating features. The net effect of such averaging results in reducing overall dimensional deviation from design-intent by one-half, as well as to establish an actual net location of the as-built vehicle body A, and use the newly established net locating centerlines $N_1$, $N_2$, and $N_3$ from which to adjust positions of the robots 136 and associated tooling components so that new net target attachment points can be more easily and accurately provided on the vehicle body AA to enable the attachment of components thereto without the need for oversized attachment holes and slip planes. The robots 136 use the new net locating centerlines $N_1$, $N_2$, and $N_3$ to locate relative thereto and perform work at new, adjusted target work locations. Under a theoretically perfect design-intent condition, the robots 136 would reference the design-intent centerlines or datums $D_x$, $D_y$, $D_z$, $O_y$ of the vehicle body A and move predefined distances therefrom to target coordinates proximate the work to be performed on the vehicle body A. Instead, however, the robots 136 reference the adjusted or actual as built centerlines or net locating lines $N_1$, $N_2$, and $N_3$ and then move the predefined distances therefrom to target coordinates or positions to create attachment points, holes or pads where outer body components can be associated to, without the need of any labor to make final fit adjustments to the panel.

Referring again to FIG. 13, the robots 136 each preferably include end-effectors or tooling 138 of some kind, such as form and pierce tooling, or form and clinch tooling exemplified by currently pending U.S. patent application Ser. Nos. 10/641,580 filed Aug. 15, 2003 and 10/329,893 filed Dec. 26, 2002 which are assigned to the assignee hereof and are all incorporated by reference herein. The present invention, however, is not limited to use with the above-described tooling 138 and may include any devices including, but not limited to, gauges, measuring devices, welders, lasers, sprayers, and the like. In accordance with the preferred embodiment, the robot tooling 138 creates attachment features for various vehicle outer body panels, sub-assemblies, and other components that are to be attached to the vehicle body A in a downstream station from the framing/welding station.

As a result of balancing out the created processing or inherent dimensional errors of the vehicle body A, all attachment features created by the robot tooling 138 are net located with respect to the newly established net reference centerlines $N_1$, $N_2$, and $N_3$ (or other types of X, Y, and Z net reference features). Furthermore, the present invention essentially creates a best fit attachment feature and completely eliminates the need to provide for a slip plane in order to attach a component to the vehicle body A A. Therefore any outer body component, i.e. hood, fender, doors, decklid, liftgate, front bumper, rear or front facia, tail-lights, etc. being attached to the body-in-white A can be fabricated with an attachment feature at net or design-intent locations since they will be attached to a best fit or net-formed, attachment feature on the vehicle body A.

A method of the present invention is provided for assembling objects to a vehicle body A. The first step involves moving the vehicle body A, having target or actual locating features $B'_L$, $B'_R$, $C'_L$, $C'_R$ thereon, into an approximate location. The approximate location is preferably established by the hard point locator pins 114 of the workstation 110 that engages the preformed setup locating features of the vehicle body A and these locations are read into a microprocessor or central processor.

Thereafter, the actual as built locating features $B'_L$, $B'_R$, $C'_L$, $C'_R$ are engaged with the position detecting apparatuses 116 and the position detecting apparatuses 116 are immobilized or the actual location of these features are read into a microprocessor 124. The term engaging is broadly defined to include interacting or operating upon, and the position detecting devices 116 are immobilized by the stanchions 122 and overhead frame 120.

The third step involves determining an imprecise distance between the actual locating features $B'_L$, $B'_R$, $C'_L$, $C'_R$ of the vehicle body A in one or more of X, Y and Z directions of a Cartesian coordinate system. In other words, the method establishes the actual location of longitudinal and lateral locating features on the vehicle body A to establish an actual coordinate system for the as-built vehicle body.

The fourth step involves creating a median of the imprecise distance, to define net reference features $N_1$, $N_2$, $N_3$ at the median. In other words, the method of the present invention balances out or averages the locations of the actual locating features B'$_L$, B'$_R$, C'$_L$, C$_R$ to establish actual vehicle body A centerlines, or other net as built reference features.

The fifth step involves locating robot tooling 138 with respect to the net reference features N$_1$, N$_2$, N$_3$ adjacent to the vehicle body A. In other words, the method of the present invention adjusts the location of certain attachment point tooling from a nominal tooling location to a re-configured target tooling location that is based on the as built actual centerlines or as built net reference features.

The sixth step involves performing work on the vehicle body A to establish a net attachment feature on the vehicle body A for assembling an object at the net attachment feature location. In other words, the method of the present invention effectively reforms a body surface to create an attachment feature to a design-intent location for such an attachment feature. Thus all attachment points are net-formed to design-intent.

The method of the present invention may be performed as a computer program and the various Cartesian coordinate data may be stored in memory 128 as a look-up table, wireframe model, or the like. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the graphics display classes, their extensions, or document-producing programs on a CD ROM or via Internet download. In a sense, the Internet itself, as an abstract entity, is a computer readable medium. The same is true of computer networks in general. It is therefore to be understood that the method of the present invention may be performed by any electronic device capable of executing the above-described functions.

This embodiment of the present invention is an improvement over prior art techniques of assembling components to a body. Many prior art techniques involve developing correction data at each individual assembling position for individual components to be attached to a body. In other words, prior art techniques require calculating the mounting locations for a vehicle body A on a component-by-component basis, such that the mounting of each component must be separately, individually adjusted. Such a process is time-consuming, complex, and ultimately not as desirable as the present invention since such prior art techniques still usually require the use of slip-planes to adjust the mounting of body components.

Instead the present invention provides apparatus and techniques for balancing out misalignment of component attachment features between position detecting apparatuses to generate new centerlines or net reference features of the vehicle at half the distance of overall deviation of the individual component attachment features. This avoids the inferior prior art process of individually recalculating the assembling positions for each body member to be attached to a vehicle body A at a specific location. Accordingly, the present invention is more accurate as effectively compared to the prior art, because the present invention uses a best-fit algorithm to net-form attachment features of the total vehicle at design-intent coordinates, regardless of misalignments due to processing through the framing/welding station of the vehicle body A. As is clear to a person skilled in the prior art the concept can easily be adapted to a specific intent application such as fitting a pivotable window into a window opening in the vehicle body to accomplish a best fit assembly position of the hinges for the window.

The invention including the method and apparatus as heretofore set forth may be embodied in other specific forms without departing from the spirit or essence of the invention. The presently disclosed embodiments are, therefore, to be considered in all respects as illustrative and not as a restriction on the invention, the scope of the invention being indicated by the appended claims. Rather the foregoing description and all changes that come within the meaning and range of equivalency of the claims are to be embraced therein.

What is claimed is:

1. An apparatus for creating net attachment features on a three-dimensional object defined by X, Y and Z Cartesian coordinates, said apparatus comprising:

a three-dimensional body having one end and an opposite end, each end of said three-dimensional body having at least one primary locating point thereon, said at least one primary locating point selectively located within a known tolerance range with respect to said X, Y and Z directions of said Cartesian coordinate system;

means for storing design-intent locations of said at least one primary locating point on said three-dimensional body defined by X, Y and Z Cartesian coordinates;

means for establishing an actual location of said at least one primary locating point on said three-dimensional body, in each of said X, Y and Z directions, said actual location being defined as a datum position;

programmable means for comparing said actual location of said at least one primary locating point on said three-dimensional body with said design-intent location of said at least one primary locating point in said means for storing in each of said X, Y and Z directions, said comparing means further comprising:

microprocessor means for determining an imprecise distance in each of said X, Y and Z directions between said actual location of said at least one primary locating point with said design-intent location; and means for creating a median point of said imprecise distance in each of said X, Y and Z directions, said median point of said imprecise distance of said at least one primary locating point of said three-dimensional body being an adjusted net position of said at least one primary locating point in each of said X, Y and Z directions on said three-dimensional body; and programmable means for directing at least one programmable work performing device to said adjusted net position to locate thereat whereby said work performing device performs work on said three-dimensional body such that at least one adjusted net attachment location is established for objects to be attached to said three-dimensional body.

2. The apparatus claimed in claim 1, wherein said three-dimensional body comprises a welded body-in-white.

3. The apparatus as claimed in claim 1, wherein said means for establishing an actual location of said at least one primary locating point on said three-dimensional body further comprises at least one triangulation-type sensor illuminator means for generating image data usable by a machine vision controller to determine three-dimensional measurements of an object.

4. The apparatus as claimed in claim 1, wherein said means for storing design-intent locations of said at least one primary locating point on said three-dimensional body comprises a microprocessor.

5. The apparatus as claimed in claim 1, wherein said means for comparing said actual location of said at least one primary locating point on said three-dimensional body with said design intent location stored in said microprocessor is a central processor means, said central processor means determining said imprecise distance in each said X, Y and Z directions between said actual location of said at least one primary locating point and said design-intent location.

6. The apparatus as claimed in claim 5, wherein said central processor further calculates said median point of said imprecise distance in each said X, Y and Z directions in order to establish a best-fit centerline or grid line or an actual vehicle Cartesian coordinate map or wire frame for the body-in-white in an as built condition whereby any error between an as built location of said at least one primary locating point and said design-intent location of said at least one primary locating point is reduced by one-half.

7. The apparatus as claimed in claim 1, wherein said means for directing said at least one programmable work-performing device is a robot means.

8. The apparatus as claimed in claim 7, wherein said robot means further comprises at least one robot located alongside said three-dimensional body; and
a work-performing tool attached to said robot.

9. A master locating apparatus for establishing a plurality of net attachment features on an imprecisely constructed three-dimensional body structure of unknown dimensional accuracy within a known tolerance range, relative to an X, Y and Z Cartesian coordinate system, said imprecisely constructed three-dimensional body structure adapted for attachment of one or more external members, said apparatus comprising:
at least one columnar member located adjacent said three-dimensional body;
at least two programmable position detecting apparatuses attached to said at least one columnar member, said at least two programmable position detecting apparatuses further being located in spaced apart relation on opposing sides of said three-dimensional body structure, each of said at least two programmable position detecting apparatuses further comprising:
programmable means for visually engaging said three-dimensional body structure at least one predetermined primary locating point to establish an actual location in at least two-dimensional planes of said three-dimensional body structure, said programmable means for visual engaging said three-dimensional body structure located alongside said three-dimensional body structure;
means for storing design-intent locations of selective primary locating points on said three-dimensional body structure defined by X, Y and Z Cartesian coordinates;
microprocessor means for comparing said actual location of said at least one predetermined primary locating point in said at least two-dimensional planes with said design-intent locations of said at least one predetermined primary locating point in each of said at least two-dimensional planes to establish an imprecise distance in each of said two-dimensional planes between said actual location and said design-intent location in each said two-dimensional planes;
means for creating a median point of said imprecise distance between said actual location found by said programmable visual engaging means for each of said two-dimensional planes and said design-intent location, said median point of said imprecise distance in each of said two-dimensional planes defining an adjusted net location; and
means for communicating said adjusted net location to a work performing device whereby said work performing device performs work on said three-dimensional body structure with respect to said adjusted net location.

10. The apparatus claimed in claim 9, wherein said at least one columnar member comprises a front and rear gantry straddling a production line such that said three-dimensional body structure can pass through thereunder.

11. The apparatus claimed in claim 10, wherein each of said at least two programmable position detecting apparatuses each have a laser thereon.

12. The apparatus claimed in claim 11, wherein said means for creating a median point of said imprecise distance comprises a microprocessor.

13. The apparatus claimed in claim 10, wherein said at least two programmable position detecting apparatuses comprise a first pair of programmable position detecting apparatuses disposed on opposite sides of said three-dimensional body structure, and a second pair of programmable position detecting apparatuses disposed on opposite sides of said three-dimensional body structure, each of said first and second pair of position detecting apparatuses having a laser sensor thereon.

14. The apparatus claimed in claim 9, wherein said at least two programmable position detecting apparatuses comprise a first pair of position detecting apparatuses disposed on opposite sides of said three-dimensional body structure, and a second pair of position detecting apparatuses disposed on said opposite sides of said three-dimensional body structure, each of said second pair of position detecting apparatuses having a laser mounted thereto.

15. The apparatus as claimed in claim 9, wherein said programmable means for visually engaging said three-dimensional body structure at an actual location of said at least one primary locating point in at least two-dimensional planes on said three-dimensional body further comprises at least one triangulation-type sensor illuminator means for generating image data useable by a machine vision controller to determine three-dimensional measurements of an object.

16. The apparatus as claimed in claim 9, wherein said means for storing design-intent locations of said selective primary locating points on said three-dimensional body comprises a microprocessor.

17. The apparatus as claimed in claim 9, further comprising means for comparing said actual location of said at least one primary locating point on said three-dimensional body with said design-intent location stored in said microprocessor is a central processor means, said central processor means determining an imprecise distance in each X, Y, and Z directions between said actual location of said at least one primary locating point and said design-intent location.

18. The apparatus as claimed in claim 17, wherein said central processor further calculates a median point of said imprecise distance in each said X, Y and Z directions in order to establish a best-fit centerline or grid line or an actual vehicle Cartesian coordinate map or wire frame for a body-in-white in the as built condition whereby any error between an as built location of said at least one primary locating point and said design-intent location of said at least one primary locating point is reduced by one-half.

19. The apparatus as claimed in claim 9, wherein said means for communicating said adjusted net location to a work performing device further comprises;
  robot means located in spaced relation to said three-dimensional body structure, said robot means having a work-performing device attached thereto.

20. The apparatus as claimed in claim 19, wherein said robot means further comprises at least one robot located alongside said opposing sides of said three-dimensional body; and
  a work-performing tool attached to each of said robots.

21. A method for assembling objects to a three-dimensional body, said method comprising the steps of:
  moving said three-dimensional body having one end and an opposite end into a fixture location, said three-dimensional body having at least one primary locating point thereon,
  visually engaging said at least one primary locating point of one end of said three-dimensional body with at least one programmable position detecting apparatus reading an actual location of said at least one primary locating point, said actual location being defined by X, Y and Z Cartesian coordinates;
  storing design-intent locations of selective primary locating points on said three-dimensional body defined by X, Y and Z Cartesian coordinates into a microprocessor;
  determining an imprecise distance by calculating in said microprocessor the variance between said design-intent location and said actual location of said at least one primary location point of said one end of said three-dimensional body in each one of X, Y and Z directions of the Cartesian coordinate system;
  creating a median point of said imprecise distance, said median point defining a new adjusted net position at said median point of said imprecise distance;
  locating at least one work performing device with respect to said new adjusted net position adjacent said three-dimensional body; and
  performing work on said three-dimensional body to establish a net attachment feature on said three-dimensional body for assembling at least one object at said net attachment feature of said three-dimensional body.

22. The method according to claim 21 further comprising the step of assembling and welding said three-dimensional body prior to said step of visually engaging said at least one primary locating point such that minimal additional variation is introduced after the position of said at least one primary locating point is established.

23. The method according to claim 21, wherein the step of visually engaging said at least one primary locating point comprises the step of providing said at least one programmable position detecting apparatus with a laser sensor, whereby said laser sensor visually engages said at least one primary locating point to establish two of said X, Y, and Z directions, and wherein said step of visually engaging said at least one primary locating point comprises the step of providing another, at least one position, primary detecting apparatus with a second laser sensor and the second of said laser sensors visually engages said at least one primary locating point to establish the third of said X, Y and Z directions.

24. The method according to claim 23, wherein the step of visually engaging said at least one primary locating point of one end of said three-dimensional body with said at least one programmable position detecting apparatus comprises the step of visually engaging a first pair of primary locating points on said one end of said three-dimensional body with a first pair of programmable position detecting apparatuses disposed on opposite sides of said three-dimensional body; and visually engaging a second pair of primary locating points on said opposite end of said three-dimensional body, said second pair of programmable position detecting apparatuses disposed on said opposite sides of said three-dimensional body.

25. The method according to claim 23, wherein the step of creating a median point of said imprecise distance comprises the step of providing a microprocessor to receive data from said step of visually engaging said at least one primary locating point on each end of said three-dimensional body and comparing said data with said design-intent positions stored in said microprocessor to generate said median point of said imprecise distance.

26. The method according to claim 23, wherein the step of locating at least one work performing device with respect to said new adjusted net position further comprises the step of communicating a calculated position of said median point to said work performing device.

27. A master locating apparatus mounted alongside of the direction of travel of an assembly line for a three-dimensional body structure of unknown dimensional construction within a known tolerance range, said master locating apparatus comprising:
  at least two columnar members in spaced apart relationship on opposite sides of said assembly line;
  a support member having respective ends, one of said ends attached to one of said at least two columnar members, the other of said ends attached to the other of said at least two columnar members;
  at least two programmable position detecting apparatuses located in spaced apart relations on opposite sides of said assembly line to permit said assembly line to pass therebetween, each of said at least two programmable position detecting apparatuses further having:
    means for visually engaging opposite sides of said three-dimensional body structure at a plurality of preselected defined locations to establish an actual position in at least three-dimensional planes of said plurality of preselected defined locations of said three-dimensional body structure on each side of said three-dimensional body structure when said three-dimensional body structure is between said visually engagement means, said means for visually engaging located alongside said assembly line and visually engaging said three-dimensional body structure at said plurality of preselected defined locations;
    programmable means for storing design-intent locations of each of said plurality of preselected defined locations of said three-dimensional body:
    programmable means for determining an imprecise distance between each of said plurality of preselected defined locations and the design-intent location of each of said plurality of preselected defined locations of said three-dimensional body:
    means for establishing a median distance point of said imprecise distance to establish an adjusted net position of each of said plurality of preselected defined locations on said one side and said opposing side of said three-dimensional body structure of each of said plurality of preselected defined locations of said three-dimensional planes, said median distance defining an adjusted net position of each of said plurality of preselected defined locations of said three-dimensional body structure; and means for performing work on said three-dimensional body structure with respect to said adjusted net position.

28. The apparatus claimed in claim 27, wherein said means for visually engaging opposite sides of said three-dimensional body structure further comprises a front and rear gantry straddling a production line such that said three-dimensional body structure can pass through thereunder.

29. The apparatus claimed in claim 27 wherein said means for visually engaging opposite sides of said three-dimensional body structure, said means further comprises a first plurality of programmable position detecting apparatuses, at least two of said first plurality of programmable position detecting apparatuses being disposed on opposing sides of said three-dimensional body structure.

30. The apparatus claimed in claim 29, wherein said means for establishing the actual location of said preselected defined locations on each end of said three-dimensional body comprises a second plurality of programmable position detecting apparatuses each having a laser sensor, at least two of said second plurality of programmable position detecting apparatuses being disposed on opposing sides of said body.

31. The apparatus claimed in claim 27, wherein each of said at least two programmable position detecting apparatuses include a laser.

32. The apparatus claimed in claim 27, wherein said means for establishing a median distance point of said imprecise distance further comprises a microprocessor.

33. The apparatus claimed in claim 27, wherein said three-dimensional body structure comprises a welded body-in-white.

34. The apparatus claimed in claim 27, wherein said at least two columnar members comprise a front and rear gantry straddling a production line such that said three-dimensional body structure can pass through thereunder.

35. The apparatus as claimed in claim 27, wherein said means for visually engaging opposite sides of said three-dimensional body structure at a plurality of preselected defined locations to establish a datum position in at least three-dimensional planes of said three-dimensional body structure further comprises at least two triangulation-type sensor illuminator means for generating image data usable by a machine vision controller to determine three-dimensional measurements of an object.

36. The apparatus as claimed in claim 27, wherein said programmable means for storing design-intent locations of each of said plurality of preselected defined locations of said three-dimensional body comprises a microprocessor.

37. The apparatus as claimed in claim 27, wherein said means for establishing a median distance further comprises programmable means for comparing said actual location of each of plurality of preselected defined locations on said body with said design intent location stored in said programmable means for storing, said programmable means for comparing determining an imprecise distance in each said X, Y and Z directions between said actual location of each of said plurality of preselected defined locations and said design-intent location.

38. The apparatus as claimed in claim 37, wherein said programmable means for comparing further calculates a median point of said distance in each X, Y and Z directions in order to establish a best-fit centerline or grid line or an actual vehicle Cartesian coordinate map or wire frame for the body-in-white in an as built condition whereby any error between an as built location of each of said preselected defined location and said design-intent locations of each of said preselected defined locations is reduced by one-half.

39. The apparatus as claimed in claim 27, wherein said means for performing work further comprises a robot means.

40. The apparatus as claimed in claim 39, wherein said robot means further comprises at least one robot located alongside each of said two columnar members on opposite sides of said assembly line, and a work performing tool attached to said at least one robot.

41. An apparatus for creating net attachment features on a three-dimensional object defined by X, Y and Z Cartesian coordinates, said apparatus comprising:

a three-dimensional body having at least one primary locating feature thereon;

means for storing design-intent locations of said at least one primary locating feature of said three-dimensional body:

means for establishing an actual location of said at least one primary locating feature in each of said X, Y and Z Cartesian coordinates;

means for calculating an imprecise distance between said actual location of said at least one primary locating feature with said design-intent location of said at least one primary locating feature in each of said X, Y and Z Cartesian coordinates;

means for creating a median of said imprecise distance in each of said X, Y and Z Cartesian coordinates, said median of said imprecise distance defining an adjusted net reference feature; and means for locating at least one work performing device with respect to said adjusted net reference feature, whereby work performed on said three-dimensional body establishes at least one adjusted net attachment feature location for objects to be attached to said three-dimensional body.

42. The apparatus as claimed in claim 41, further comprising means for net-forming surfaces of said three-dimensional body at design-intent coordinates for said objects.

43. A method for assembling objects to a three-dimensional body comprising the steps of:

moving said three-dimensional body having as-build defined locating features thereon into a fixture location;

engaging said locating features with programmable position detecting apparatuses;

storing design-intent positions of said defined locating features of said three-dimensional body in a central processor;

determining an imprecise distance between said as-build defined locating features of said three-dimensional body and said design-intent positions of said defined locating features in one or more of X, Y and Z directions of a Cartesian coordinate system;

creating a median of said imprecise distance in each of said X, Y and Z directions to define best-fit net reference features; and locating robot tooling with respect to said best-fit net reference features to perform work on said three-dimensional body.

44. The method as claimed in claim 43, further comprising the step of providing a programmable robot with a work performing tool attached thereto to net-form at least one attachment feature on said three-dimensional body for assembling said object to said at least one net attachment feature.

* * * * *

UNITED STATES PATENT AND TRADEMARK OFFICE
CERTIFICATE OF CORRECTION

PATENT NO.        : 7,143,494 B2
APPLICATION NO.   : 10/779185
DATED             : December 5, 2006
INVENTOR(S)       : Mark Savoy It is certified that error appears in the above-identified patent and that said Letters Patent is hereby corrected as shown below:

In the Title, Line 54, kindly delete "METHOD AND APPARATUS FOR ASSEMBLING EXTERIOR AUTOMOTIVE VEHICLE BODY COMPONENTS ONTO AN AUTOMOTIVE VEHICLE BODY" and insert --METHOD AND APPARATUS FOR ASSEMBLING EXTERIOR AUTOMOTIVE VEHICLE BODY COMPONENTS ONTO AN AUTOMOTIVE VEHICLE BODY FRAME--.

In Column 1, Line 1, kindly delete "METHOD AND APPARATUS FOR ASSEMBLING EXTERIOR AUTOMOTIVE VEHICLE BODY COMPONENTS ONTO AN AUTOMOTIVE VEHICLE BODY" and insert --METHOD AND APPARATUS FOR ASSEMBLING EXTERIOR AUTOMOTIVE VEHICLE BODY COMPONENTS ONTO AN AUTOMOTIVE VEHICLE BODY FRAME--.

In Column 13, Line 38, kindly delete "processes" and insert --processed--.

In Column 14, Line 51, kindly delete "body A A" and insert --body A--.

In Column 14, Line 56, kindly delete "body A A" and insert --body A--.

In Column 14, Line 58, after "a" kindly insert --result,--.

In Column 14, Line 59, kindly delete "G" and insert --₵--.

In Column 14, Line 62, kindly delete "G" and insert --₵--.

In Column 15, Line 6, kindly delete "C" and insert --₵--.

In Column 15, Line 8, kindly delete "C" and insert --₵--.

In Column 15, Line 47, after "fore/aft" kindly insert --X--.

In Column 16, Line 40, kindly delete "body A A" and insert --body A--.

In Column 17, Line 7, before "sockets" kindly insert --output--.

In Column 17, Line 15, before "sockets" kindly insert --output--.

UNITED STATES PATENT AND TRADEMARK OFFICE
CERTIFICATE OF CORRECTION

| | | |
|---|---|---|
| PATENT NO. | : 7,143,494 B2 | |
| APPLICATION NO. | : 10/779185 | |
| DATED | : December 5, 2006 | |
| INVENTOR(S) | : Mark Savoy | |

It is certified that error appears in the above-identified patent and that said Letters Patent is hereby corrected as shown below:

In Column 17, Line 29, after "B" kindly insert --,B--.

In Column 18, Line 4, kindly delete "body A A" and insert --body A--.

In Column 18, Line 8, kindly delete "body A A" and insert --body A--.

In Column 18, Line 9, kindly delete "body A A" and insert --body A--.

In Column 18, Line 31, kindly delete "body A A" and insert --body A--.

In Column 18, Line 34, kindly delete "A A" and insert --A--.

In Column 18, Line 37, kindly delete "body A A" and insert --body A--.

In Column 18, Line 48, kindly delete "body A A" and insert --body A--.

In Column 19, Line 55, kindly delete "80" and insert --30--.

In Column 19, Line 58, kindly delete "body A A" and insert --body A--.

In Column 19, Line 62, kindly delete "body A A" and insert --body A--.

In Column 20, Line 47, kindly delete "body A A" and insert --body A--.

In Column 21, Line 5, kindly delete "A A" and insert --A--.

In Column 21, Line 27, kindly delete "sensing apparatuses" and insert --detecting apparatuses 116--.

In Column 21, Line 27, kindly delete "position sensing" and insert --position detecting--.

In Column 21, Line 28, after "apparatuses", kindly insert --116--.

In Column 21, Line 59, kindly delete "body A A" and insert --body A--.

In Column 22, Line 33, kindly delete "body A A" and insert --body A--.

UNITED STATES PATENT AND TRADEMARK OFFICE
CERTIFICATE OF CORRECTION

| | |
|---|---|
| PATENT NO. | : 7,143,494 B2 |
| APPLICATION NO. | : 10/779185 |
| DATED | : December 5, 2006 |
| INVENTOR(S) | : Mark Savoy |

It is certified that error appears in the above-identified patent and that said Letters Patent is hereby corrected as shown below:

In Column 22, Line 48, after "processer", kindly insert --124--.

In Column 22, Line 63, after "body" kindly insert --A--.

In Column 23, Line 54, kindly delete "A".

In Column 24, Line 2, kindly delete "A".

In Column 24, Line 8, kindly delete "A".

In Column 27, Line 10, Claim 19, after "comprises;" kindly insert --directing said at least one programmable work performing device to said adjusted net location; and--.

In Column 29, Line 56, Claim 37, after "distance" kindly insert --point--.

In Column 29, Line 58, Claim 37, before "plurality" kindly insert --said--.

In Column 29, Line 59, Claim 37, kindly delete "location" and insert --locations--.

In Column 29, Line 61, Claim 37, after "comparing" kindly insert --and--.

In Column 29, Line 65, Claim 38, after "median" kindly insert --distance--.

In Column 29, Line 65, Claim 38, before "distance" kindly insert --imprecise--.

UNITED STATES PATENT AND TRADEMARK OFFICE
CERTIFICATE OF CORRECTION

PATENT NO. : 7,143,494 B2
APPLICATION NO. : 10/779185
DATED : December 5, 2006
INVENTOR(S) : Mark Savoy It is certified that error appears in the above-identified patent and that said Letters Patent is hereby corrected as shown below:

In Column 29, Line 65, Claim 38, before "X" kindly insert --of said--.

In Column 30, Line 20, Claim 41, kindly delete "body:" and insert --body;--.

Signed and Sealed this

First Day of July, 2008

JON W. DUDAS
*Director of the United States Patent and Trademark Office*